(12) United States Patent
Harper et al.

(10) Patent No.: US 11,299,093 B2
(45) Date of Patent: *Apr. 12, 2022

(54) ACOUSTIC NOTIFICATIONS

(71) Applicant: Zoox, Inc., Foster City, CA (US)

(72) Inventors: Jacob Avi Harper, Alameda, CA (US);
Jeremy Yi-Xiong Yang, New York, NY (US); Forrest Leighton Merrill, Walnut Creek, CA (US); Michael Moshe Kohen, Palo Alto, CA (US); George Dalman Nelson, III, San Francisco, CA (US); Subasingha Shaminda Subasingha, San Ramon, CA (US); Josh Alexander Jimenez, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/092,623

(22) Filed: Nov. 9, 2020

(65) Prior Publication Data

US 2021/0122291 A1 Apr. 29, 2021

Related U.S. Application Data

(63) Continuation of application No. 16/436,486, filed on Jun. 10, 2019, now Pat. No. 10,829,040, which is a
(Continued)

(51) Int. Cl.
*B60Q 5/00* (2006.01)
*H04R 1/40* (2006.01)
(Continued)

(52) U.S. Cl.
CPC ............. *B60Q 5/006* (2013.01); *B60Q 5/008* (2013.01); *G08G 1/166* (2013.01); *H04R 1/403* (2013.01);
(Continued)

(58) Field of Classification Search
CPC ...... H04R 1/403; H04R 3/12; H04R 2499/13; H04R 1/323; H04R 2201/403;
(Continued)

(56) References Cited

U.S. PATENT DOCUMENTS 7,106,180 B1 * 9/2006 Pompei ................. A01M 29/18
340/384.7
9,351,073 B1 5/2016 Alexandrov
(Continued)

OTHER PUBLICATIONS

Final Office Action dated Mar. 13, 2019 for U.S. Appl. No. 15/986,752 "Acoustic Notifications" Harper, 15 pages.
(Continued)

*Primary Examiner* — Jason R Kurr
(74) *Attorney, Agent, or Firm* — Lee & Hayes, P.C.

(57) ABSTRACT

Techniques for using beam-formed acoustic notifications for pedestrian notification are described. Computing device(s) can receive sensor data associated with an object in an environment of a vehicle. The computing device(s) can determine first data for emitting a first beam of acoustic energy via speaker(s) of an acoustic array associated with the vehicle, and second data for emitting a second beam of acoustic energy via speakers of the acoustic array. The computing device(s) can cause the speaker(s) to emit the first beam in a direction of the object at a first time and the second beam in the direction of the object at a second time. Directions of propagation of the first beam and the second beam are offset so that the object can localize the source the acoustic notification, thereby localizing the vehicle in the environment.

20 Claims, 13 Drawing Sheets

Related U.S. Application Data continuation of application No. 15/986,739, filed on May 22, 2018, now Pat. No. 10,315,563.

(51) Int. Cl.
  *G08G 1/16* (2006.01)
  *H04R 3/12* (2006.01)
  *H04R 1/32* (2006.01)

(52) U.S. Cl.
  CPC ............... *H04R 3/12* (2013.01); *H04R 1/323* (2013.01); *H04R 2201/403* (2013.01); *H04R 2499/13* (2013.01)

(58) Field of Classification Search
  CPC ........ B60Q 5/006; B60Q 5/008; B60Q 9/008; B60Q 9/007; G08G 1/16; G08G 1/163; G08G 1/166; H04S 7/303
  See application file for complete search history.

(56) References Cited

U.S. PATENT DOCUMENTS

| | | | |
|---|---|---|---|
| 9,612,123 B1 | 4/2017 | Levinson | |
| 9,878,664 B2 | 1/2018 | Kentley-Klay | |
| 2004/0151325 A1 | 8/2004 | Hooley et al. | |
| 2011/0026729 A1* | 2/2011 | Nakayama | B60Q 5/008 381/86 |
| 2011/0175713 A1 | 7/2011 | Nakayama | |
| 2013/0121515 A1* | 5/2013 | Hooley | H04R 1/403 381/307 |
| 2015/0049887 A1 | 2/2015 | Bleacher et al. | |
| 2016/0304027 A1 | 10/2016 | Di Censo et al. | |
| 2017/0120814 A1* | 5/2017 | Kentley | B60C 5/008 |
| 2017/0222612 A1 | 8/2017 | Zollner | |
| 2018/0050635 A1* | 2/2018 | Vincent | B60Q 9/008 |
| 2018/0118106 A1 | 5/2018 | You et al. | |
| 2018/0118107 A1 | 5/2018 | You et al. | |
| 2018/0173234 A1 | 6/2018 | Van Laack et al. | |
| 2019/0001881 A1 | 1/2019 | You et al. | |
| 2019/0359128 A1 | 11/2019 | Harper et al. | |
| 2020/0124706 A1 | 4/2020 | Buddendick et al. | |

OTHER PUBLICATIONS

Office Action for U.S. Appl. No. 15/986,739, dated Nov. 1, 2018, Harper et al., "Acoustic Notifications", 15 pages.

Non Final Office Action dated Mar. 26, 2020 for U.S. Appl. No. 16/436,486 "Acoustic Notifications" Harper, 17 pages.

* cited by examiner

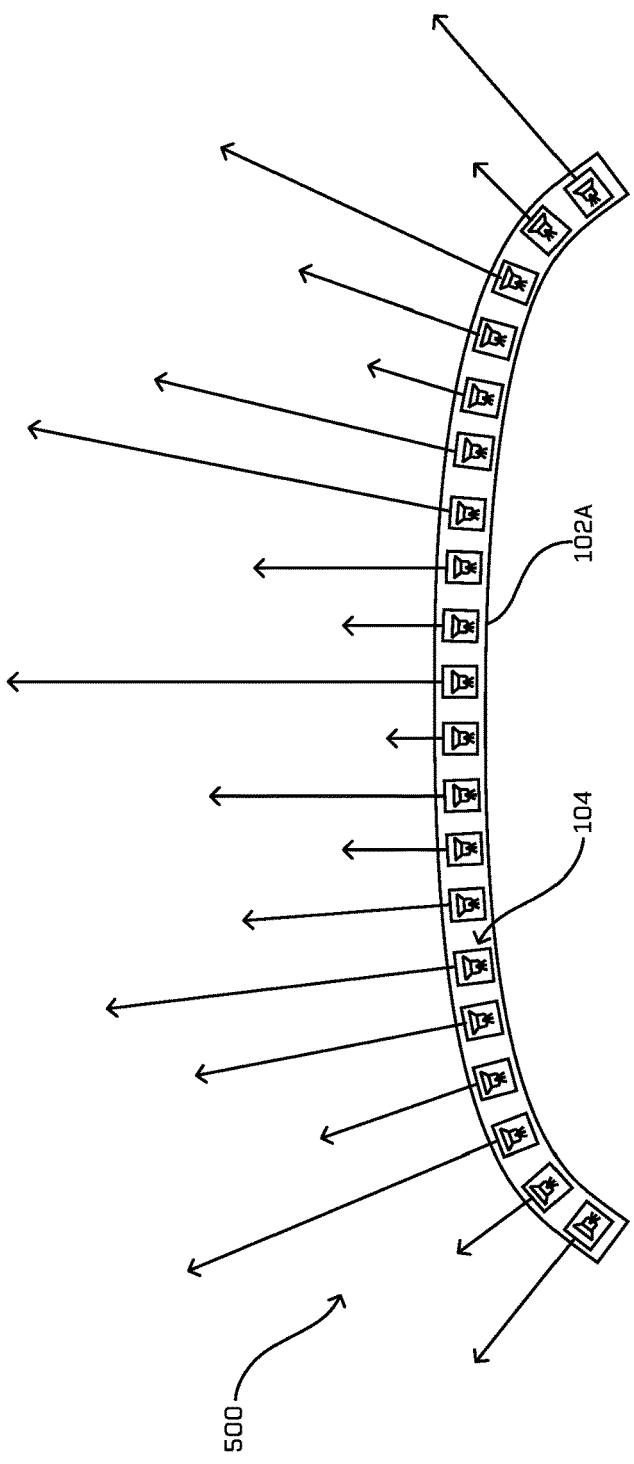
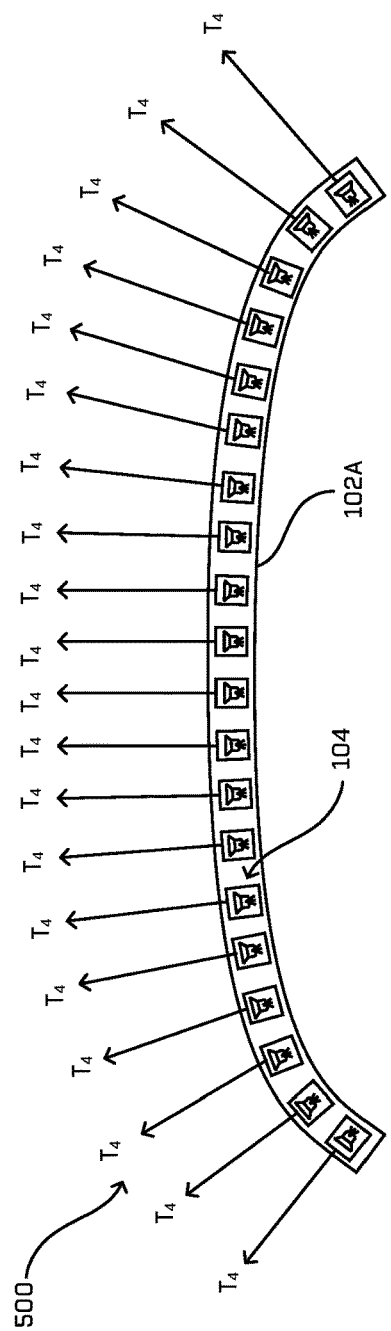
FIG. 5A
FIG. 5B

ACOUSTIC NOTIFICATIONS

RELATED APPLICATION

This application is a continuation of, and claims priority to, commonly assigned, co-pending U.S. patent application Ser. No. 16/436,486, filed Jun. 10, 2019, which is a continuation of U.S. patent application Ser. No. 15/986,739, filed on May 22, 2018, now U.S. Pat. No. 10,315,563 and issued Jun. 11, 2019. application Ser. Nos. 16/436,486 and 15/986,739 and U.S. Pat. No. 10,315,563 are all fully incorporated herein by reference.

BACKGROUND

Vehicles can encounter many situations in which they should alert persons, vehicles, and the like, of their presence in order to avert a potential collision or otherwise prevent the vehicle coming within an unsafe distance of an external object. As one example, a pedestrian who crosses the road in front of the vehicle can be jaywalking or may not be paying attention to the approach of the vehicle. The driver of the vehicle can use the vehicle's horn to alert the pedestrian. However, a horn will typically have an acoustic radiation pattern that is sub-optimal in that it may not be sufficient to warn the pedestrian that the horn being honked is intended for him/her. Instead, other pedestrians or other drivers in the vicinity of the vehicle can believe the horn is being honked at them. Moreover, a pattern of the sound waves emitted by the horn can make it difficult to localize the source of the horn. From the perspective of the pedestrian, the horn can be perceived as coming from another vehicle. Furthermore, the horn can cause the pedestrian to look in a direction other than the direction of the vehicle that generated the horn honk, thereby potentially distracting the pedestrian from the actual source of the horn.

Additionally, electric vehicles can be difficult to audibly detect due to low levels of emitted noise from an electric and/or hybrid propulsion system (e.g., lack of combustion engine noise and/or lower levels of tire noise) making it difficult for others to hear the vehicle as it travels. Further, the reaction time required for a vehicle to generate an alert, and the reaction time of a person (or other vehicle) after hearing the alert, are such that relying solely on outputting an alert to avert a potential collision or an approach of the vehicle within an unsafe distance of an external object is inadequate, especially for many close-encounter collision scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5A illustrates an example of an acoustic notification that can be output via an acoustic array utilizing a multi-channel configuration.

FIG. 5B illustrates another example of an acoustic notification that can be output via an acoustic array utilizing a multi-channel configuration.

DETAILED DESCRIPTION

Figure 1A:
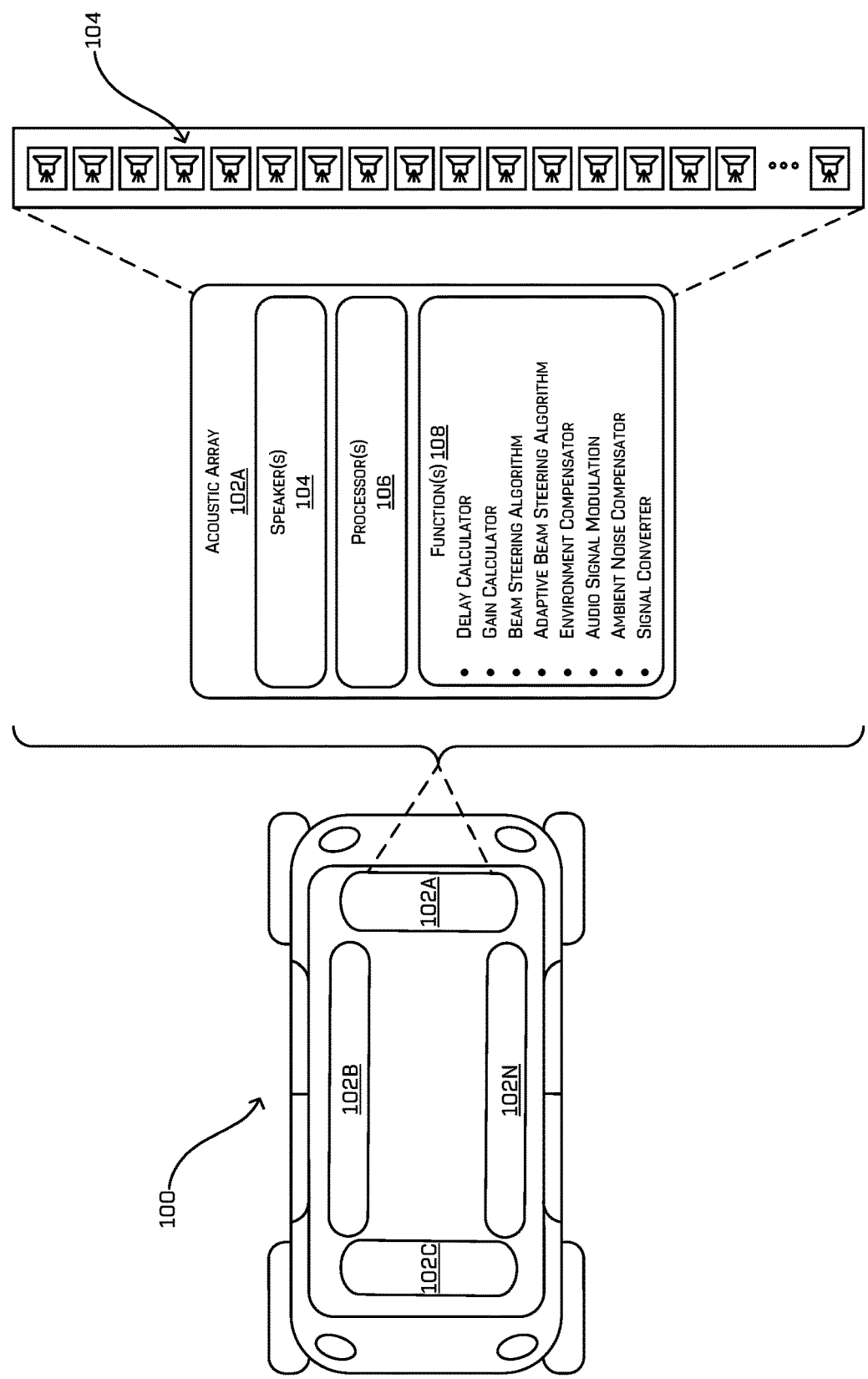
FIG. 1A illustrates an example vehicle that is associated with one or more acoustic arrays in a linear array configuration.

Techniques described herein are directed to using acoustic notifications for communicating information to objects in environments of autonomous vehicles. An autonomous vehicle can include acoustic arrays on one or more exterior surfaces of the autonomous vehicle, which, at least in some examples, can be used to steer beams of acoustic energy (i.e., acoustic beam steering). These acoustic arrays can have speakers configured to output beams of acoustic energy, which can provide notification to pedestrians, for instance of a presence of the autonomous vehicle or a potential collision. In at least one example, techniques described herein are directed to manipulating beam-formed audio signals (e.g., moving a beam-formed audio signal side to side) in such a way that a pedestrian (or other external object) proximate a vehicle (e.g., an autonomous vehicle) can hear a sound (e.g., resulting from the speakers emitting the beam-formed audio signals) and can identify a source of the sound. That is, the pedestrian (or other external object) can engage stereoscopic hearing to localize the vehicle. Further, because autonomous vehicles lack human drivers to convey intents (e.g., indications of what the driver is intending to do), in some examples, the acoustic array can emit sounds such that the pedestrian (or other external object) can additionally determine the behavior of the vehicle based on the emitted sound.

Furthermore, in some examples, the acoustic arrays can be associated with multi-channel speaker configurations, wherein one or more speakers of an acoustic array can be associated with different channels. Techniques described herein are directed to sending different signals to different channels such that, when sounds are emitted by speaker(s) corresponding to the different channels (based on the different signals), a pedestrian (or other external object) can hear a sound that is spatialized across a surface of a proximate vehicle (e.g., an autonomous vehicle). As a result, the pedestrian (or other external object) can identify a source of the sound (e.g., the autonomous vehicle) and can additionally determine a size of the vehicle (e.g., width). In some examples, the pedestrian (or other external object) can further determine the behavior of the vehicle based on the spatialized sound.

Accordingly, techniques described herein enable pedestrians (or other external objects) to identify a source of a sound (output by an autonomous vehicle) with more efficacy and safety than with existing techniques. For instance, techniques described herein enable an autonomous vehicle to convey its position to objects in its environment, which enables pedestrians (or other external objects) to avert potential collisions or approaches of the autonomous vehicle within an unsafe distance. Furthermore, techniques described herein enable autonomous vehicles to be more easily audibly detectable, while reducing a volume of the sound necessary for perceiving the sound. As such, techniques described herein are directed to increasing safety for autonomous vehicles, particularly for pedestrians or other external objects in environments of such autonomous vehicles.

FIG. 1A illustrates an example vehicle 100 that is associated with one or more acoustic arrays 102. The example vehicle 100 shown in FIG. 1A is an automobile having four wheels. Other types and configurations of vehicles are contemplated, such as, for example, vans, sport utility vehicles, cross-over vehicles, trucks, buses, agricultural vehicles, and construction vehicles. The vehicle 100 can be powered by one or more internal combustion engines, one or more electric motors, hydrogen power, any combination thereof, and/or any other suitable power sources. For the purpose of illustration, the vehicle 100 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 100 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 100 are described below.

As described above, the vehicle 100 can include one or more acoustic arrays 102, which can be associated with one or more exterior surfaces of the vehicle 100. While four acoustic arrays 102A-102N are illustrated, the vehicle 100 can include any number of acoustic arrays 102. The acoustic arrays 102 need not be identical in configuration or dimensions. For instance, in at least one example, acoustic arrays 102A and 102C can be shorter in length than acoustic arrays 102B and 102N, as well as have differing number of speakers, placement of speakers, size of speakers, curvature, etc. In at least one example, an enclosure or other structure can house each of the acoustic arrays 102 and such an enclosure or other structure can be mounted on an exterior surface of the vehicle 100. In at least one example, the acoustic arrays 102 can be mounted (e.g., via a respective enclosure or other structure) to direct their respective outputs outward into the environment within which the vehicle 100 is positioned, toward a location of an object targeted to receive an acoustic notification. In at least one example, the vehicle 100 can be bidirectional and as such, the acoustic arrays 102 may not have a front or rear designation. Instead, depending on which direction the vehicle 100 is driving, any acoustic array 102A-102N can be the acoustic array facing the direction of travel (and thus, the front acoustic array at that time).

For the ease of illustration, a single acoustic array 102A is described, however, each acoustic array 102A-102N can have a same or similar structure and/or perform the same or similar functions. The acoustic array 102A can include several speaker(s) 104, with each speaker in the acoustic array 102A being coupled with an output amplifier. Each amplifier can include a gain input and a signal input.

The acoustic array 102A can include (or otherwise be associated with, e.g. from a remote system) one or more processors 106 (e.g., microprocessor(s), digital signal processor(s) (DSP), etc.) that can be configured to receive data (e.g., signal(s), described below) and process the data to generate one or more sounds into an environment within which the vehicle 100 is positioned. In at least one example, the acoustic array 102A can output one or more sounds such to form a beam of steered acoustic energy. While FIG. 1A illustrates that the processor(s) 106 are associated with the acoustic array 102A, in an alternative example, the processor(s) 106 can be electrically coupled to any number of acoustic arrays 102. Or, in an alternative example, the acoustic array 102A can be electrically coupled to other processor(s). The processor(s) 106 can calculate data representing a gain for the gain input of each amplifier and can calculate data representing a signal delay for the signal input of each amplifier. The processor(s) 106 can access and/or or receive data (e.g., speaker data) representing information on the speaker(s) 104 (e.g., from an internal and/or external data source) and the information can include, but is not limited to, array width, speaker spacing in the acoustic array 102A, a wave length distance between adjacent speakers in the acoustic array 102A, a number of speakers in the acoustic array 102A, speaker characteristics (e.g., frequency response, output level per watt of power, etc.), etc.

The processor(s) 106 can implement function(s) 108 to operate the acoustic array 102A. The function(s) 108 can be implemented in hardware, software, or a combination thereof (e.g., processor(s) 106, computer-readable media executable by the processor(s) 106, ASICs, FPGAs, etc.), and the function(s) 108 implemented can include, but are not limited to, a delay calculator, a gain calculator, a beam steering algorithm, an adaptive beam steering algorithm, an environment compensator, an audio signal modulator, an ambient noise compensator, and a signal converter. While the function(s) 108 are shown external to the processor(s) 106, in an alternative example, one or more of the function(s) 108 can be integral to the processor(s) 106. In at least one example, the processor(s) 106 can access and/or receive speaker data which can be utilized in association with implementation of the function(s) 108.

In at least one example, data and signals received by the processor(s) 106 can be converted from one format to another format using the signal converter. For example, the signal converter can convert digital data to an analog signal using a digital-to-analog converter (DAC) and can convert an analog signal to digital data using an analog-to-digital converter (ADC). In at least one example, processing of data representing audio signal(s), data representing microphone signal(s), and data representing the environmental signal(s) can be handled in the analog domain using the DAC, the digital domain using ADC, or both.

Data representing environmental signal(s) (e.g., from environmental sensor(s)) and output data representing compensated environment data, such as the speed of sound (e.g., compensated for temperature, altitude, etc.), can be converted by the environment compensator for use by the beam steering algorithms.

The ambient noise compensator can receive data representing ambient noise (e.g., from a microphone) and process the data to output data representing gain compensation. The data representing the gain compensation can be indicative of ambient noise levels in the environment external to the vehicle 100. High levels of ambient noise can require gain levels applied to the amplifiers in one or more channels to be increased to compensate for the high levels of ambient noise. The gain calculator can receive the data representing gain compensation and can increase gain or decrease gain in one or more of the channels of the acoustic array 102A. Additionally, or alternatively, one or more algorithms can be used to perform frequency analysis (e.g., a Fourier analysis) to determine which frequencies are prevalent in an environment such that frequencies which are less prevalent (e.g., having lower relative power in a Fourier analysis) may be used for acoustic emissions from the acoustic array 102A.

The acoustic array 102A can receive data representing an audio signal and data representing a modulation signal (e.g., from a microphone or from another audio signal) and can modulate the data representing the audio signal using the data representing the modulation signal via audio signal modulation. For example, the data representing the modulation signal can be based on regenerative braking noise generated by a drive system of the vehicle 100. A signal from a microphone can be the signal source for the data representing the modulation signal, and an amplitude of the data representing the modulation signal can be used to modulate the data representing the audio signal (e.g., from a digital audio file). The audio signal modulator can process the data representing the audio signal and data representing the modulation signal in the analog domain (e.g., using DAC in the signal converter) or the digital domain (e.g., using ADC in the signal converter).

The gain calculator and the delay calculator can calculate channel gains and channel delays for the acoustic array 102A using algorithms specific to the type of beam steering algorithm being implemented for the acoustic array 102A, such as for the beam steering algorithm or the adaptive beam steering algorithm, for example. Additional details associated with the beam steering algorithm and the adaptive beam steering algorithm are described in U.S. Pat. No. 9,878,664, issued on Jan. 30, 2018, entitled "Method for Robotic Vehicle Communication with an External Environment via Acoustic Beam Forming," the entire contents of which are hereby incorporated by reference. In some examples, the gain calculator and the delay calculator can determine data for outputting an acoustic notification that is perceived as moving from a first side to a second side. In at least one example, the gain calculator and the delay calculator can determine data for steering an acoustic beam from a first angle to a second angle (e.g., sweeping). In additional or alternative examples, during sweeping, a combined signal (i.e., a sum of the acoustic notification at the first angle and the second angle) may be input into a windowed high pass filter and an amplitude of the filtered signal may be smoothly varied from a maximum amplitude to a minimum amplitude and back during the transition. Such a process can be utilized to remove any artifacts (e.g., pops, clicks, scratches, etc.) associated with sweeping.

In at least one example, the processor(s) 106 can receive data, as described below, and generate one or more channels of gain and one or more channels of delay for the acoustic array 102A. In at least one example, the gain calculator can implement array shading by adjusting the gain ($G_e$) applied to amplifiers coupled to speaker(s) 104 at edge portions of the acoustic array 102A to be less than a gain ($G_m$) applied to amplifiers coupled to speakers at middle portions of the acoustic array 102A. For example, after applying array shading, the gain at middle portions of the acoustic array 102A ($G_m$) is greater than the gain at the edge portions of the acoustic array 102A ($G_e$). Speaker position accessed from speaker data can be used to determine which speaker positions in the acoustic array 102A have the edge gain ($G_e$) applied to their amplifiers and which positions in the acoustic array 102A have the middle gain ($G_m$) applied to their amplifiers. For instance, if the acoustic array 102A has 32 speaker(s) 104 such that there are 32 speaker positions, then eight speakers at each edge portion can have the edge gain ($G_e$) applied to their respective amplifiers and 16 speakers at the middle portion can have the middle gain ($G_m$) applied to their respective amplifiers. The middle gain ($G_m$) can vary among the speaker(s) 104 in the middle portion. The edge gain ($G_e$) can vary among the speaker(s) 104 in the edge portions.

In at least one example, the acoustic array 102A can have a closed-form solution for delays and gains for each speaker so as to create a beam of acoustic energy in a particular direction (e.g., at a user specified angle with respect to the array), such as a linear array with fixed spacing between individual speakers, as illustrated in FIG. 1A. Techniques described above with respect to adding time delays to an audio signal at individual speakers are directed to closed-form solutions.

Figure 1B:
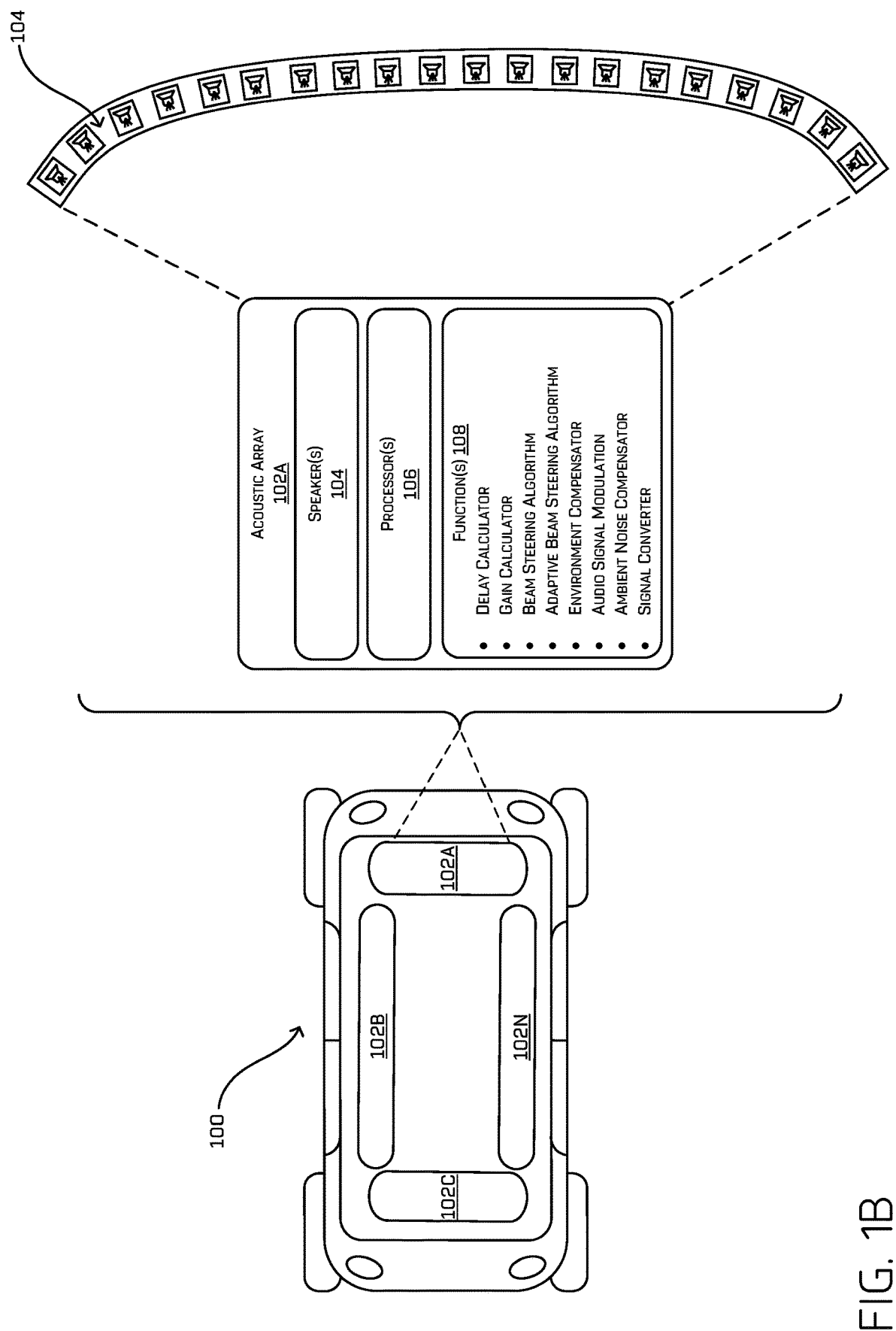
FIG. 1B illustrates another example vehicle that is associated with one or more acoustic arrays in an arbitrary array configuration.

However, in alternative examples where an arbitrary acoustic array is utilized, generating acoustic array can have a non-closed form solution. An arbitrary array can include a linear array, a curved array, etc., wherein such arrays may or may not have non-uniform spacing between speakers, differing sizes of speakers, and the like. An example of a curved, arbitrary array is shown as the acoustic array 102A in FIG. 1B. With respect to such arbitrary acoustic arrays, simple geometry cannot be used to determine what time delays should be added at individual speakers to create the beam steering effect. As such, techniques can be used to estimate time delays based on far-field summations for individual beam angles and use such estimates to determine a representative pattern of non-closed-form solution array pattern for arbitrarily spaced (e.g., non-linear) elements (e.g., which may be accomplished in simulation). Furthermore, in at least one example, the acoustic array 102A in FIG. 1B can use amplitude tapering (i.e., reducing a signal amplitude as speaker position is further from a center of the array) to enhance the performance of non-closed-form solution array patterns. Such a tapering may result in a linear, polynomial, exponential, or otherwise decay of a signal amplitude with respect a center speaker of the acoustic array. In at least one example, the acoustic array 102A in FIG. 1B can utilize the function(s) 108 described above; however, the function(s) 108 can additionally include Lagrange filter coefficients as applied to gains and a taper function (e.g., Nuttall), which can be centered in a direction of a beam, to determine time delays for outputting audio signals.

Figure 2:
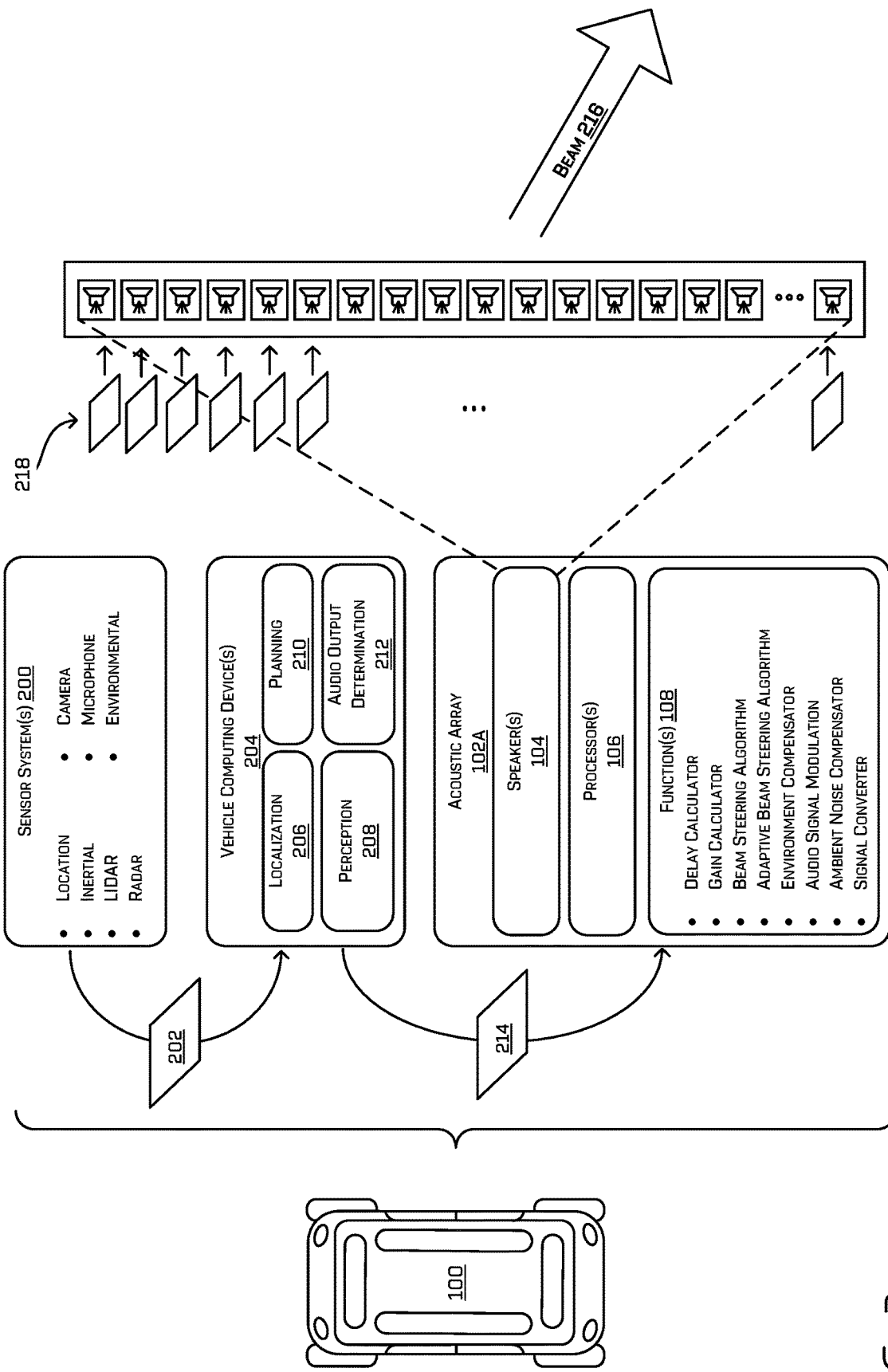
FIG. 2 illustrates an example of using an acoustic array for emitting a beam of acoustic energy utilizing beam-formed audio.

FIG. 2 illustrates an example of using an acoustic array, such as the acoustic array 102A, for emitting a beam of acoustic energy using beam-formed audio.

In at least one example, the vehicle 100 can be associated with one or more sensor system(s) 200 that can be disposed on the vehicle 100. The one or more sensor system(s) 200 can include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environmental sensors (e.g., temperature sensors, humidity sensors, light sensors, pressure sensors, etc.), etc. The one or more sensor system(s) 200 can generate sensor data 202, which can be utilized by vehicle computing device(s) 204 onboard the vehicle 100.

Furthermore, in at least one example, the vehicle computing device(s) 204 can include one or more systems, including, but not limited to, a localization system 206, a perception system 208, a planning system 210, and an audio output determination system 212.

In at least one example, the localization system 206 can determine a pose of the vehicle 100 (e.g., position, orientation, etc.) and/or determine where the vehicle 100 is in relation to a local and/or global map based at least in part on sensor data 202 received from the sensor system(s) 200 and/or map data associated with a map. A map can be any number of data structures modeled in two dimensions or three dimensions that are capable of providing information about an environment, such as, but not limited to, topologies (such as intersections), streets, mountain ranges, roads, terrain, and the environment in general.

In at least one example, the perception system 208 can perform object detection, segmentation, and/or classification based at least in part on the sensor data 202 received from the sensor system(s) 200. For instance, in at least one example, the perception system 208 can identify other objects, such as a pedestrian, a cyclist, another vehicle, etc., in the environment within which the vehicle 100 is positioned. Furthermore, the perception system 208 can track one or more of a pose of other objects (e.g., position, orientation, etc.) or a velocity of other objects in the environment.

In at least one example, the planning system 210 can determine routes and/or trajectories to use to control the vehicle 100 based at least in part on the sensor data 202 received from the sensor system(s) 200. In at least one example, the planning system 210 can include a prediction system that can predict the behavior of other objects in the environment within which the vehicle 100 is positioned based at least in part on sensor data 202 received from the sensor system(s) 200.

Additional details of localization systems, perception systems, and/or planning systems that are usable can be found in U.S. Pat. No. 9,612,123, issued on Apr. 4, 2017, entitled "Adaptive Mapping to Navigate Autonomous Vehicle Responsive to Physical Environment Changes," and U.S. patent application Ser. No. 15/632,208, filed Jun. 23, 2017, entitled "Trajectory Generation and Execution Architecture," both of which are incorporated herein by reference, in their entirety. In an example where the vehicle 100 is not an autonomous vehicle, one or more of the aforementioned systems can be omitted from the vehicle 100.

The audio output determination system 212 can facilitate broadcasting acoustic notifications (e.g., acoustic notifications) into the environment external to the vehicle 100 using the acoustic arrays 102. In at least one example, the audio output determination system 212 can be configured to determine when to send a signal 214 (e.g., a control signal) to the one or more acoustic arrays 102. In at least one example, the signal 214 can be associated with a trigger signal and can include data such as an audio signal selected, directions of propagation for emitting one or more beams of acoustic steered energy, and/or a timing for emitting the one or more beams of acoustic steered energy. In at least one example, the signal 214 can further include modulation signal data received by acoustic arrays 102. Additional details are described below with reference to FIGS. 3A and 3B.

The audio output determination system 212 can send the signal 214 to an acoustic array 102A to activate the acoustic array 102A. In at least one example, the audio output determination system 212 can send the signal 214 to the acoustic array that is positioned approximately in the direction of a target object (e.g., if the target object is in front of the vehicle 100, the audio output determination system 212 can send a signal 214 to the acoustic array 102A). As described above, in at least one example, the acoustic array 102A can include one or more processors 106 (e.g., microprocessor(s), digital signal processor(s) (DSP), etc.) that can be configured to receive the signal 214 and process the data to generate, using the acoustic array 102A, signals which can be output as a beam of steered acoustic energy 216 into an environment within which the vehicle 100 is positioned.

The acoustic array 102A can include several speaker(s) 104, with each speaker in the acoustic array 102A being coupled with an output amplifier. Each amplifier can include a gain input and a signal input. The processor(s) 106 can perform function(s) 108 to calculate data representing a gain for the gain input of each amplifier and can calculate data representing a signal delay for the signal input of each amplifier. As described above, the processor(s) 106 can access and/or or receive speaker data representing information on the speaker(s) 104 (e.g., from an internal and/or external data source). Responsive to receiving the signal 214, the processor(s) 106 can perform the function(s) 108, based on the speaker data, and can send signals 218 to each of the speaker(s) 104. Each of the speaker(s) 104 can emit acoustic energy based on the signals 218, thereby emitting a beam of steered acoustic energy 216.

The foregoing description of techniques for emitting a beam of acoustic energy 216 are described and shown in the context of a single beam of acoustic energy. However, in additional or alternative examples, the same or similar techniques can be implemented to output any number of beams of acoustic energy, as described below. In some examples, the signal 214 can include data to instruct the acoustic array 102A to output at least a first beam of acoustic energy and a second beam of acoustic energy (e.g., at an offset as described below). In other examples, multiple signals 214 can be sent to the acoustic array 102A, which can instruct the acoustic array 102A to output multiple beams of acoustic energy (e.g., a first signal for instructing the acoustic array 102A to output the first beam of acoustic energy and a second signal for instructing the acoustic array 102A to output the second beam of acoustic energy).

While the acoustic array 102A is illustrated as a linear array configuration (e.g., configuration associated with a closed-form solution for delays and/or gains for beam steering), in alternative examples, the acoustic array 102A can have another configuration (e.g., curved, non-uniform, arbitrary, etc.). That is, the illustrated configuration of the acoustic array 102A should not be construed as a limitation.

Figure 3A:
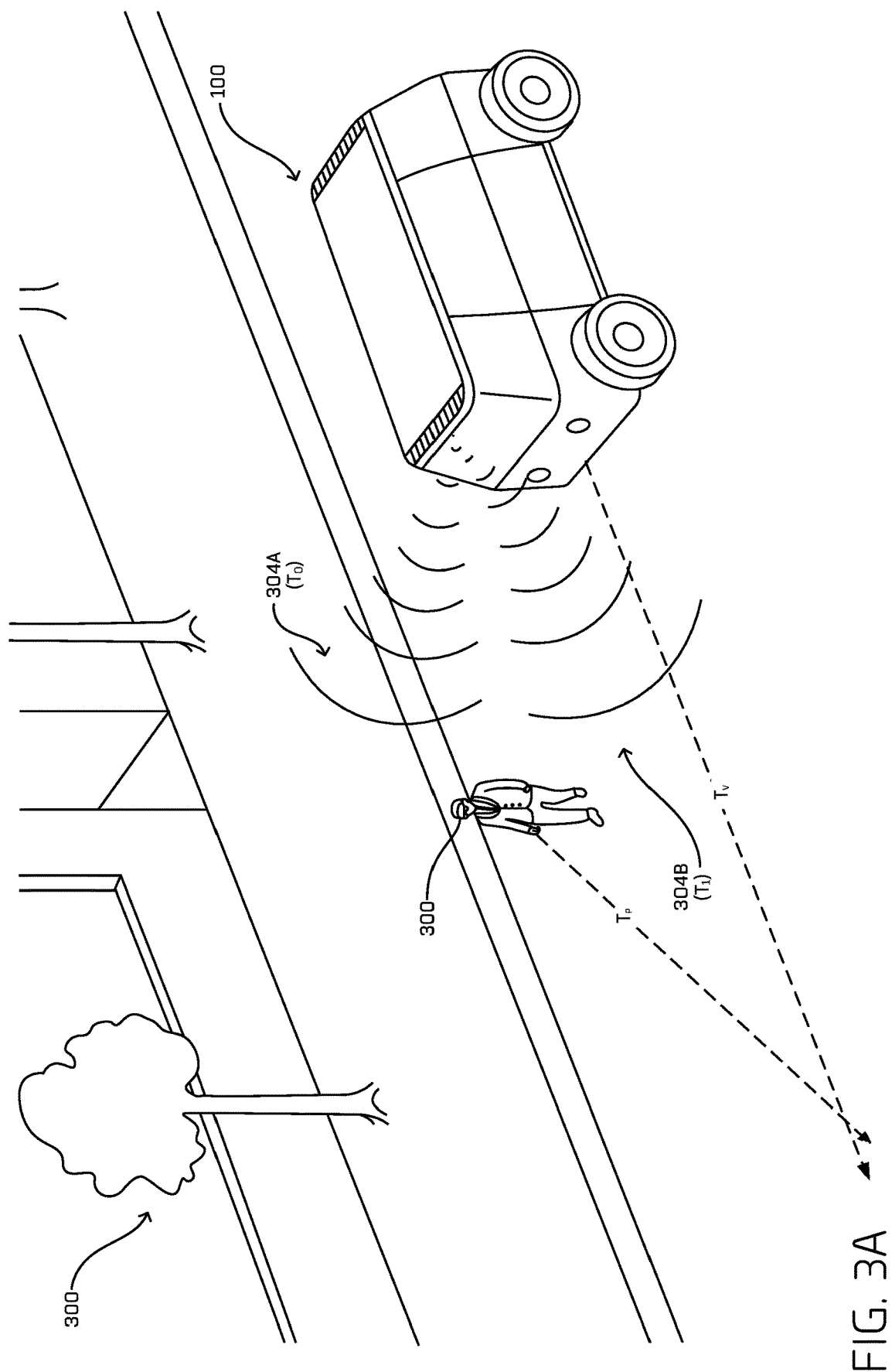
FIG. 3A illustrates a perspective view of an example of outputting an acoustic notification to alert a pedestrian of a possible collision or unsafe proximity to a vehicle.
Figure 3B:
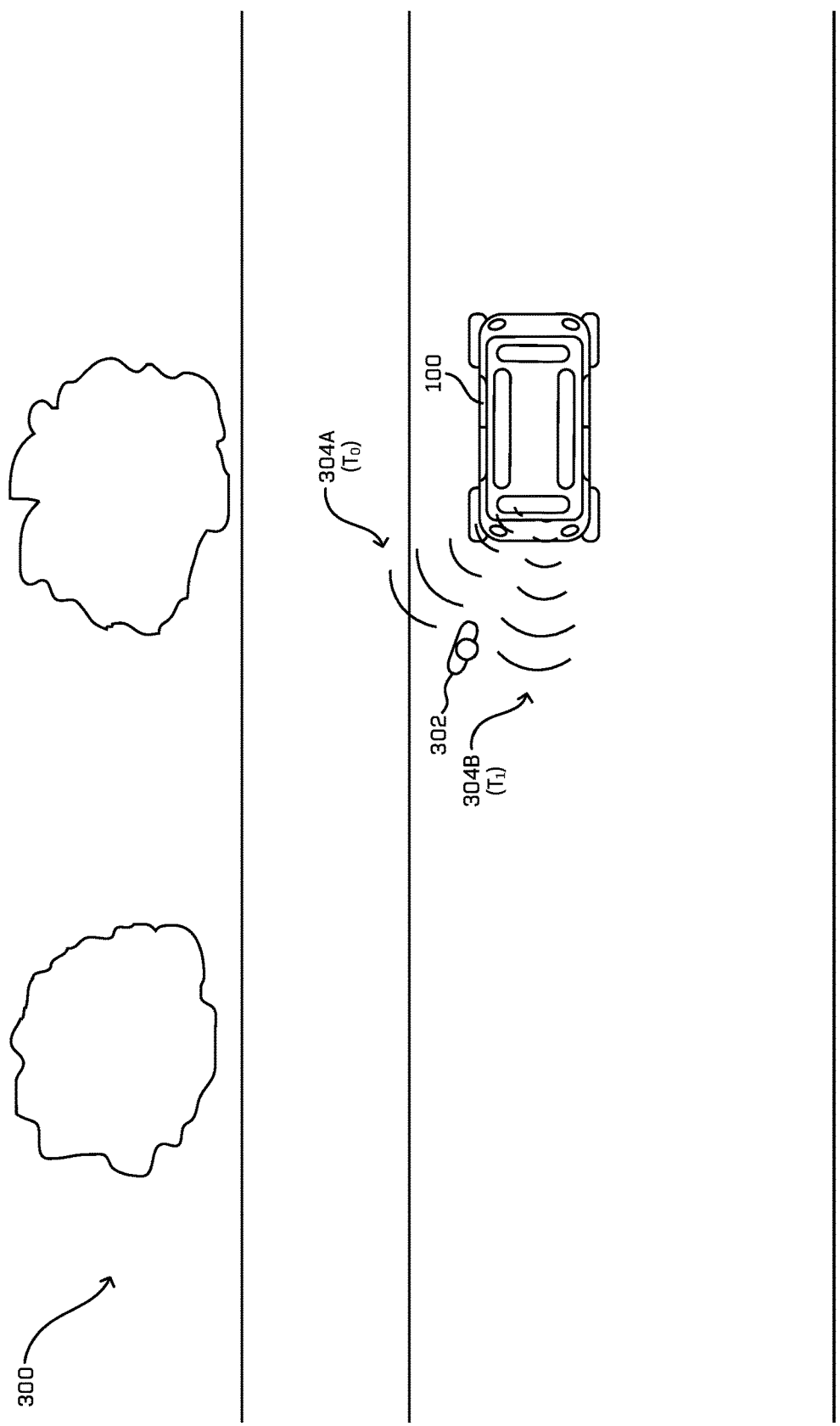
FIG. 3B illustrates a top view of an example of outputting an acoustic notification to alert a pedestrian of a possible collision or unsafe proximity to a vehicle.

FIGS. 3A and 3B illustrate an example of outputting an acoustic notification to alert a pedestrian of a possible collision. FIG. 3A illustrates a perspective view of an environment 300 within which a vehicle 100 is positioned. FIG. 3B illustrates a top view of the environment 300 (with the trajectory lines omitted for clarity).

In at least one example, the sensor system(s) 200 can generate sensor data 202 and provide such sensor data 202 to the vehicle computing device(s) 204. The localizer system 206 can analyze the sensor data 202 to determine local pose data (e.g., position, orientation estimation data) for the location of the vehicle 100 in the environment 300. In at least one example, the planning system 210 can determine a trajectory ($T_v$) of the vehicle 100 as indicated by the arrow. For the purposes of this discussion, a trajectory can be a sequence of positions, poses, velocities, and/or accelerations of the vehicle 100 as it proceeds through a limited portion of an environment, such as the environment 300. In at least one example, the perception system 208 can process the sensor data 202 to detect a pedestrian 302 in the environment 300. In at least one example, the planning system 210 can estimate a trajectory ($T_p$) for the pedestrian 302. In at least one example, the planning system 210 can determine a location associated with where the pedestrian trajectory ($T_p$) and the vehicle trajectory ($T_v$) are likely to intersect (which, in some examples, may cause a collision between the vehicle 100 and the pedestrian 302 or cause the vehicle 100 to come within an unsafe distance of the pedestrian 302). In at least one example, the planning system 210 can estimate one or more threshold locations in the environment 300, at which to communicate an acoustic notification when the location of the pedestrian 302 coincides with the threshold locations along the pedestrian trajectory ($T_p$). The coincidence of the location of the pedestrian 302 and a threshold location can correspond to a trigger event. That is, in at least one example, the one or more threshold locations can trigger the output of acoustic notifications (e.g., when the location of the pedestrian 302 coincides with a threshold location).

The planning system 210 can determine the location of the pedestrian 302, which can correspond to Cartesian coordinates (e.g., X, Y, Z), polar coordinates, an angle, etc. In at least one example, the location of the pedestrian 302 can be relative to a location of the vehicle 100 and/or a reference location on the vehicle 100 (e.g., a reference point on the acoustic array 102A). In at least one example, the planning system 210 can compare the location of the pedestrian 302 (along the pedestrian trajectory ($T_p$)) with one or more threshold locations and, based at least in part on the planning system 210 determining that the pedestrian trajectory ($T_p$) crosses a threshold location, the planning system 210 can send an indication to the audio output determination system 212. Responsive to receiving the indication from the planning system 210, the audio output determination system 212 can generate a trigger signal for causing an acoustic notification to be output by one or more of the acoustic arrays 102.

In at least one example, the audio output determination system 212 can access audio signal data (e.g., from an audio signal data storage (e.g., one or more digital audio files), an external resource (e.g., the Cloud, the Internet, a data repository, etc.), etc.) and select an audio signal that is to be output as an acoustic notification (e.g., an acoustic alert, etc.). That is, the audio output determination system 212 can select data representing an audio signal that can be used to generate the acoustic notification using one or more of the acoustic arrays 102. Different audio signals can be representative of different information (e.g., threat levels, etc.). In some examples, an acoustic notification can comprise more than one audio signal.

In at least one example, an acoustic notification can be associated with a multi-beam output, wherein a first beam of acoustic energy 304A is output at a first time ($T_0$) and a second beam of acoustic energy 304B is output at a second time ($T_1$). In at least one example, the first time ($T_0$) and the second time ($T_1$) can be associated with a period of time (e.g., 100 ms, etc.) such that the first beam 304A and the second beam 304B are perceived by the pedestrian 302 sequentially. In at least one example, the first beam 304A and the second beam 304B can be emitted in different directions of propagation. In such an example, the audio output determination system 212 can leverage the location of the pedestrian 302 and the location of the vehicle 100 to calculate directions of propagation for the beams of steered acoustic energy 304A and 304B. In some examples, the audio output determination system 212 can determine one or more directions of propagation for one or more beams of steered acoustic energy that are emitted between the first beam of acoustic energy 304A and the second beam of acoustic energy 304B (e.g., either continuously or discretely) so that the acoustic notification is perceived as sweeping from a first position to a second position relative to the pedestrian 302. Though described above with respect to a single period of time (e.g., a delay period between $T_0$ and $T_1$), in at least some examples, the beam(s) of steered acoustic energy may oscillate from a first side of the pedestrian 302 to a second side of the pedestrian 302 with a given frequency (e.g., 10 Hz). In such examples, a third beam of steered acoustic energy can be output in the first direction of propagation at a third time and a fourth beam of steered acoustic energy can be output in the second direction at a fourth time to effectuate the oscillation. In some examples, the delay period between the second time and third time and the third time and the fourth time can correspond to the delay period between the first time and the second time. In other examples, the delay periods between the first time, second time, third time, and/or fourth time can be different. As would be appreciated, in such an example, the relative directions of emission of the beams 304A, 304B may change based on determined positions of the pedestrian and any motion of the vehicle 100.

In at least one example, the audio output determination system 212 can determine the location of the pedestrian 302 at a point corresponding to a threshold location and the location of the vehicle 100 to calculate a coordinate (e.g., an angle or other direction of emission) for a first direction of propagation of the first beam 304A. For instance, the audio output determination system 212 can determine the coordinate based on a predetermined reference point on the vehicle 100 and/or on another predetermined reference point on the acoustic array 102A. As one example, if a predetermined reference point has coordinates ($X_a$, $Y_a$), a processor, circuitry, an algorithm or some combination of the foregoing can calculate the coordinate for the first beam 304A (e.g., based on trigonometric analysis) relative to vehicle trajectory ($T_v$). Furthermore, in at least one example, the audio output determination system 212 can additionally calculate a coordinate (e.g., an angle or other direction of emission) for a second direction of propagation of the second beam 304B. As one example, if a predetermined reference point has coordinates ($X_a$, $Y_a$), a processor, circuitry, an algorithm or some combination of the foregoing can calculate the coordinate for the second beam 304B (e.g., based on trigonometric analysis) relative to vehicle trajectory ($T_v$).

In at least one example, the first direction of propagation and the second direction of propagation can be offset by an angle. In some examples, the angle can be determined based on an extent of the pedestrian 302 (or average pedestrian), a pose of the pedestrian 302 (e.g., position, orientation, etc.), a distance between the pedestrian 302 and the vehicle 100, an angle of the pedestrian 302 relative to the vehicle 100 (e.g., angle from a normal of the vehicle 100), a type of message to be communicated, etc. In at least one example, the angular offset can cause the first beam 304A to be emitted on a first side of the pedestrian 302 and the second beam 304B to be emitted on a second, opposite side of the pedestrian 302, such that the acoustic notification moves from a first side to a second side (e.g., "wiggles"). For instance, in FIGS. 3A and 3B, the first beam 304A is shown as being emitted behind the pedestrian 302 and the second beam 304B is shown as being emitted in front of the pedestrian 302. However, in additional or alternative examples, the first beam 304A can be emitted to the left of the pedestrian 302 and the second beam 304B is shown as being emitted to the right of the pedestrian 302, or vice versa. In at least one example, the directions of emission of the first and second beams 304A, 304B are determined such that the acoustic beams are first incident on a first ear of the pedestrian 302 and subsequently on a second ear of the pedestrian 302. More generally, the emission directions are determined such that width of the beams 304A, 304B can be based on an extent (e.g., height, length, width) of the pedestrian 302.

As described above with reference to FIG. 2, in at least one example, the audio output determination system 212 can send a signal 214 to one or more acoustic arrays 102. In at least one example, the signal 214 can be associated with a trigger signal and can include data such as an audio signal selected, directions (e.g., the first direction and the second direction) of propagation for emitting the beams (e.g., the first beam 304A and the second beam 304B) of acoustic steered energy, and/or a timing for emitting the beams of acoustic steered energy (e.g., the amount of time between the first time ($T_0$) and the second time ($T_1$)). That is, the audio output determination system 212 can send the signal 214 to the acoustic array 102A to cause the speaker(s) 104 to emit the first beam 304A and the second beam 304B in their respective directions of propagation and at their respective times. In at least one example, the first beam 304A and the second beam 304B, when emitted, can be perceived by the pedestrian 302 as moving side to side (e.g., wiggling). As a result, the pedestrian 302, using stereoscopic hearing, can localize the vehicle 100 based on the acoustic notification, and in some examples, can determine the behavior of the vehicle 100 (e.g., a direction the vehicle 100 is moving, etc.).

In at least one example, upon receiving the signal 214, the acoustic array 102A can emit the beams of steered acoustic energy 304 towards the pedestrian 302 along the directions of propagation, and at the prescribed times (and/or constantly). The acoustic array 102A can emit the beams of steered acoustic energy 304 based at least in part on the signal 214 and/or speaker data, as described above. For instance, in at least one example, the processor(s) 106 associated with the acoustic array 102 can leverage the signal 214 and/or the speaker data to calculate data representing a gain for the gain input of each amplifier coupled to a speaker and a signal delay for the signal input of each amplifier to effectuate the acoustic notification. Furthermore, in some examples, the acoustic array 102A can utilize additional or alternative signal(s), such as object pose, microphone signal(s), environmental signal(s), audio signals, etc. for determining how to emit the beams of steered acoustic energy 304 for effectuating the acoustic notification.

In at least one example, the acoustic array 102A can emit the first beam 304A indicative of the data representing the selected audio signal (e.g., the acoustic energy reproduces the sound encoded in the audio signal), along the first direction of propagation at the first time ($T_0$), and can emit the second beam 304B indicative of the data representing the selected audio signal, along the second direction of propagation at the second time ($T_1$). That is, at least a portion of the speaker(s) 104 can emit the first beam 304A indicative of the data representing the selected audio signal (e.g., the acoustic energy reproduces the sound encoded in the audio signal), along the first direction of propagation at the first time ($T_0$), and at least a portion of the speaker(s) 104 can emit the second beam 304B indicative of the data representing the selected audio signal, along the second direction of propagation at the second time ($T_1$). In some examples, the portions of speaker(s) 104 can be the same speakers in the acoustic array 102A and, in other examples, the portions of speaker(s) 104 can be different speakers in the acoustic array 102A.

In some examples, the audio output determination system 212 can send one or more subsequent signals 214 to the acoustic array 102A to cause the speaker(s) 104 to oscillate between emitting the first beam 304A and the second beam 304B in their respective directions of propagation at a defined frequency (e.g., 10 Hz or 100 ms) such that the acoustic notification is perceived by the pedestrian 302 as moving side to side (e.g., wiggling) for a sustained amount of time. In such examples, the audio output determination system 212 can determine a frequency for sending the subsequent signals 214, which corresponds to a rate at which the first beam 304A and the second beam 304B are subsequently emitted from the one or more acoustic arrays 102. That is, in at least one example, the audio output determination system 212 can determine a frequency at which the pedestrian 302 hears the acoustic notification move from side to side repeatedly. In at least one example, the subsequent signals 214 can include updated directions of propagation and or timing, which can be based on updated sensor data 202 received by the vehicle computing device(s) 204. That is, as the vehicle 100 and/or the pedestrian 302 move, the audio output determination system 212 can update the directions of propagation and/or timing at which additional beams of acoustic energy are to be output by the acoustic array 102A.

In some examples, the sound of the acoustic notification can vary, for instance, based on a proximity of a pedestrian 302 relative to the vehicle 100 (e.g., level of threat). In such examples, subsequent signals 214 can include different audio signals. Additional details associated with varying the sound of the acoustic notification (e.g., the audio signal) are described in U.S. Pat. No. 9,878,664, entitled "Method for Robotic Vehicle Communication with an External Environment via Acoustic Beam Forming," the entire contents of which are hereby incorporated by reference.

As a result of the acoustic notification emitted by the acoustic array 102A, the pedestrian 302 can use stereoscopic hearing to localize the vehicle 100, and in some examples, can determine the behavior of the vehicle 100 (e.g., a direction the vehicle 100 is moving, etc.).

In at least one example, after the acoustic array 102A outputs the beams of acoustic energy, the localization system 206 and/or perception system 208 can determine updated pose information for the vehicle 100 and/or the pedestrian 302. In at least one example, the planning system 210 can leverage updated pose information to generate an updated trajectory for the vehicle 100 (e.g., a trajectory that causes the vehicle 100 to avoid the pedestrian 302 or otherwise change its current trajectory ($T_v$)) to mitigate danger or otherwise redirect the vehicle 100.

While the aforementioned examples are directed to providing acoustic notifications to a pedestrian, the same or similar techniques can be instituted for any other external objects detected in the environment 300 of the vehicle 100 (e.g., animals, such as dogs, other vehicles, etc.). Furthermore, while the aforementioned examples are directed to providing acoustic notifications via the acoustic array 102A, the same or similar techniques can be instituted for any other acoustic array 102B-102N of the vehicle 100.

Figure 4:
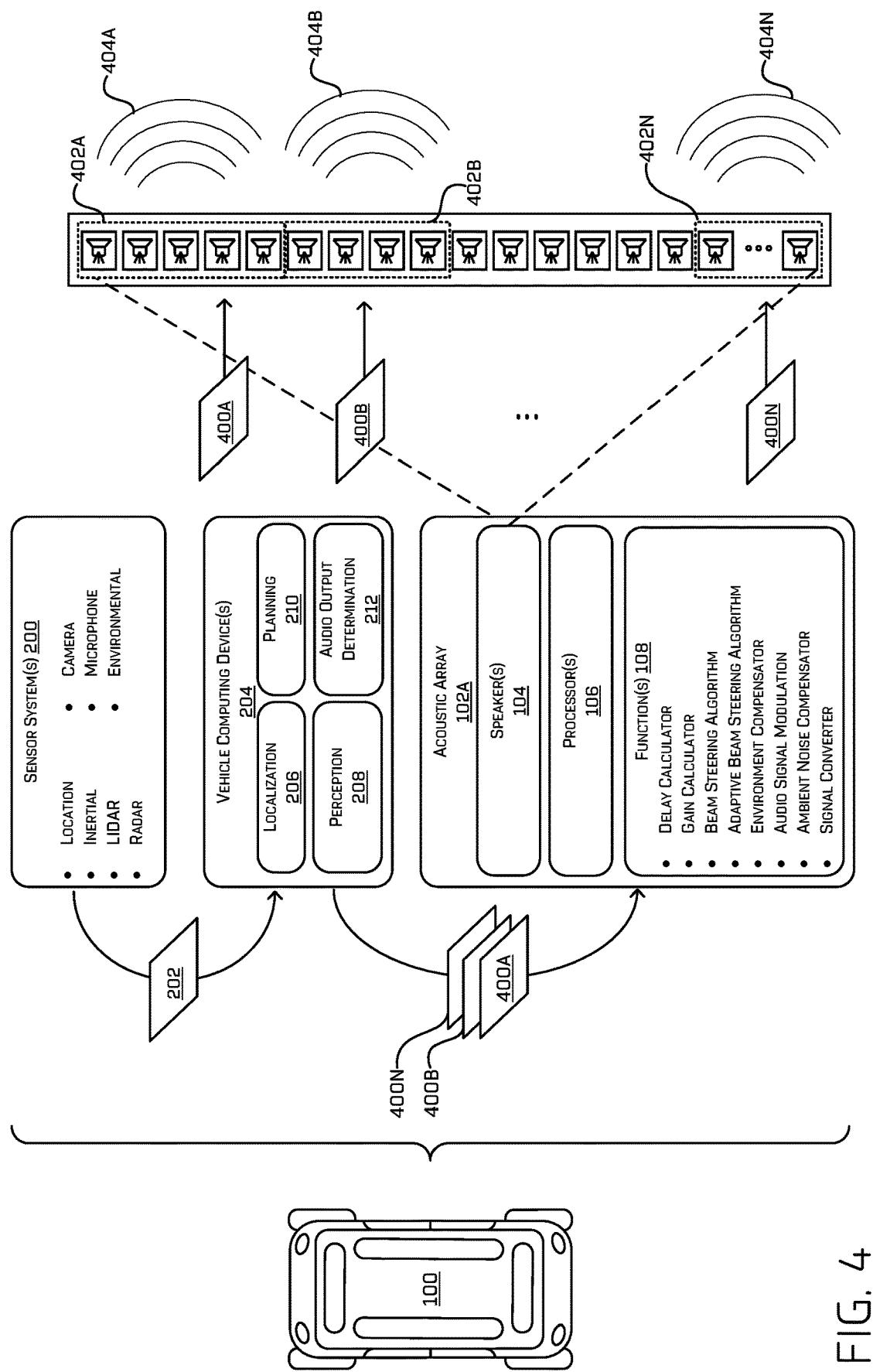
FIG. 4 illustrates an example of using an acoustic array for emitting beams of acoustic energy via multiple channels.

FIG. 4 illustrates an example of using an acoustic array, such as the acoustic array 102A, for emitting sounds via multiple channels. The vehicle components shown in FIG. 4 can correspond to the same vehicle components illustrated in FIG. 2. That is, as described above with reference to FIG. 2, the vehicle 100 can include one or more sensor system(s) 200 that can be disposed on the vehicle 100. The one or more sensor system(s) 200 can generate sensor data 202, which can be utilized by vehicle computing device(s) 204 onboard the vehicle 100. In at least one example, the vehicle computing device(s) 204 can include systems, such as a localization system 206, a perception system 208, a planning system 210, and an audio output determination system 212, as described above. In at least one example, the audio output determination system 212 can send signals 400A-400N (referred to generally as signals 400) to the acoustic array 102A. For the purpose of this discussion, signals 400 can be control signals (e.g., like signal 214).

In at least one example, the acoustic array 102A can have multi-channel functionality. That is, one or more of the speaker(s) 104 can be associated with different channels. For instance, as illustrated, a first group of speaker(s) 402A can correspond to a first channel, a second group of speaker(s) 402B can correspond to a second channel, and so on. For the purpose of this discussion, a "group" of speaker(s) can comprise one or more speakers. The acoustic array 102A can comprise any number of channels. Further, though the groups are depicted in FIG. 4 as being contiguous for illustrative purposes, in at least some examples, speakers of the groups need not be so limiting (e.g. speakers in a group may be separated by one or more speakers from another group).

As described above in FIG. 2, in at least one example, the audio output determination system 212 can be configured to determine when to send a signal 214 to the one or more acoustic arrays 102. That is, the audio output determination system 212 can send a single input signal 214, which can be output by different speaker(s) 104 in different ways. In FIG. 4, however, the audio output determination system 212 can be configured to determine when to send signals 400 to individual channels of the one or more acoustic arrays 102. That is, in FIG. 4, the audio output determination system 212 can send multiple signals 400 that can be output by different channels(s) of speakers in different ways.

In at least one example, the audio output determination system 212 can send a first signal 400A to a first group of speaker(s) 402A, a second signal 400B to the second group of speaker(s) 402B, and so on. Each signal 400A-400N can include data indicating an audio signal, a timing for emitting a sound, a volume for emitting a sound, audio characteristics (e.g., a frequency, a volume, a pitch, a tone, a duration, etc.) for emitting a sound, etc. In at least one example, individual signals (e.g., signal 400A, signal 400B, etc.) can be associated with a same audio signal or different audio signals, which can be associated with a same digital audio file. That is, in at least one example, each signal 400A-400N can be associated with sound that, when collectively emitted, comprises an acoustic notification corresponding to a digital audio file. Furthermore, in at least one example, the audio output determination system 212 can determine a timing for emitting a sound, a volume for emitting a sound, audio characteristics (e.g., a frequency, a volume, a pitch, a tone, a duration, etc.) for emitting a sound, etc. via a particular channel and can send such information to a group of speaker(s) associated with the particular channel. Responsive to receiving the signals 400, each group of speakers 402A-402N can emit a sound. In at least one example, responsive to receiving a signal 400A, the first group of speaker(s) 402A can emit a sound 404A, responsive to receiving a signal 400B, the second group of speaker(s) 402B can emit a sound 404B, and so on.

Each group of speakers corresponding to a channel in the multi-channel configuration can emit a sound based on the respective signal received, and as such, a plurality of sounds can be spatialized across the surface of the vehicle 100. That is, the multi-channel configuration can be utilized to dynamically output sounds via individual channels such that the plurality of sounds can be spatialized across the surface of the vehicle 100. For the purpose of this discussion, the multi-channel configuration can be used to modify at least one of a timing for emitting a sound, a volume for emitting a sound, an audio characteristic for emitting a sound, etc. to cause the sounds to be output dynamically. Additional details are described below with reference to FIGS. 5A-5D. In some examples, where a channel is associated with more than one speaker, the channel can receive a signal indicating a direction of propagation and the multiple speakers can output a beam of steered energy as a sound.

In some examples, the audio output determination system 212 can send one or more subsequent signals to the acoustic array 102A to cause the speaker(s) 104 to emit additional sounds continuously such that the acoustic notification is output for a sustained amount of time. In such examples, the audio output determination system 212 can determine a frequency for sending the subsequent signals, which corresponds to a rate at which the additional sounds are subsequently emitted from the acoustic array 102A. In an alternate example, the signals 400 can include instructions to emit the additional sounds such that the acoustic notification is output for a sustained amount of time (e.g., which can correspond to a predetermined period of time or the receipt of a stop signal).

In some examples, the audio output determination system 212 can send signals 400 to the acoustic array 102A responsive to a trigger event (e.g., velocity falls below a threshold velocity, object detection, location, etc.). In such examples, a default state of the vehicle 100 may be to not send signals 400 (e.g., and therefore not emit acoustic notifications). In an alternative example, the audio output determination system 212 can send signals 400 to the acoustic array 102A continuously, in near-real time, so long as the vehicle 100 is turned on (e.g., running). That is, in some examples, a default state of the vehicle 100 may be to send signals 400 (e.g., and therefore emit acoustic notifications). In such examples, the trigger event can correspond to the vehicle 100 being turned on. In such examples, the audio output determination system 212 can determine not to send signals 400 responsive to a stop event (e.g., velocity exceeds a threshold velocity, no object detection, presence in a particular location, etc.).

In at least one example, the audio output determination system 212 can send signals 400 to the acoustic array 102A responsive to determining that the vehicle 100 is travelling at a velocity below a threshold velocity. For instance, the audio output determination system 212 can cause sounds to be emitted by the speaker(s) 104 when the vehicle 100 is travelling at a velocity below a threshold velocity (e.g., in the city). In some examples, the audio output determination system 212 can send signals 400 continuously until the velocity of the vehicle 100 is determined to meet or exceed the threshold velocity. That is, the audio output determination system 212 can cause sounds to not be emitted by the speaker(s) 104 when the vehicle 100 is travelling at a velocity at or above a threshold velocity (e.g., on the highway).

In another example, the audio output determination system 212 can send signals 400 to the acoustic array 102A responsive to detecting an object within a threshold distance of the vehicle 100. For instance, the audio output determination system 212 can cause sounds to be emitted by the speaker(s) 104 when the vehicle 100 is proximate to an object (e.g., within a threshold distance of the object). In some examples, the audio output determination system 212 can send signals 400 continuously until the vehicle (e.g., the perception system 208) no longer detects an object within a threshold distance of the vehicle 100. That is, the audio output determination system 212 can cause sounds to not be emitted by the speaker(s) 104 when the vehicle 100 is travelling in an environment where other objects are not detected.

In yet another example, the audio output determination system 212 can send signals 400 to the acoustic array 102A responsive to a location of the vehicle 100. For instance, the audio output determination system 212 can cause sounds to be emitted by the speaker(s) 104 when the vehicle 100 is in a particular location (or a particular geofence) (e.g., a city, a neighborhood, etc.) as determined by location data (e.g., GPS data), map data, etc. (e.g., as determined by the localization system 206). In some examples, the audio output determination system 212 can send signals 400 continuously until the vehicle 100 (e.g., as determined by the perception system 208) is no longer in the particular location. Conversely, in some examples, the audio output determination system 212 can cause sounds to not be emitted by the speaker(s) 104 when the vehicle 100 is in a particular location (e.g., a city, a neighborhood, etc.) as determined by location data (e.g., GPS data), map data, etc. (e.g., as determined by the localization system 206).

Further, in at least one example, the audio output determination system 212 can cause sounds to be emitted for a predetermined period of time after which the audio output determination system 212 can cause sounds not to be emitted. In at least one example, the predetermined period of time can be informed by the digital audio file to which the acoustic notification corresponds.

While the acoustic array 102A is illustrated as a linear array configuration (e.g., a closed-form solution), in alternative examples, the acoustic array 102A can have another configuration (e.g., arbitrary array, etc.). That is, the illustrated configuration of the acoustic array 102A should not be construed as a limitation.

FIGS. 5A-5D illustrate examples of acoustic notifications that can be output via the acoustic array 102A using a multi-channel configuration. In at least one example, the individual channels can output sounds 500 at different times, at different volumes, with different audio characteristics, etc. to cause the sounds 500 to be output dynamically. In some examples, the sounds 500 output via each channel can be associated with the same audio signal or different audio signals. In FIGS. 5A-5D each speaker corresponds to a different channel.

As illustrated in FIG. 5A, the sounds 500 are output by different channels, at different times, and/or at different volumes (e.g., as represented by the length of representative line) such that a pedestrian can perceive the acoustic notification as agitating (e.g., "fluttering") across the surface of the vehicle 100. As such, the pedestrian can localize the vehicle 100, determine a geometry of the vehicle 100 (e.g., width, length, etc.), and, in some examples, determine a behavior of the vehicle 100 (e.g., slowing down, speeding up, turning, etc.). In at least one example, the sounds 500 can be output one after another, moving in a direction across a surface of the vehicle 100 (e.g., right to left, left to right, front to back, back to front, etc.). The delay between each emission of a sound can be due to timing as indicated in the signal sent to each group of speaker(s) corresponding to each channel (e.g., from the audio output determination system 212) (e.g., in signals 400).

Figure 5C:
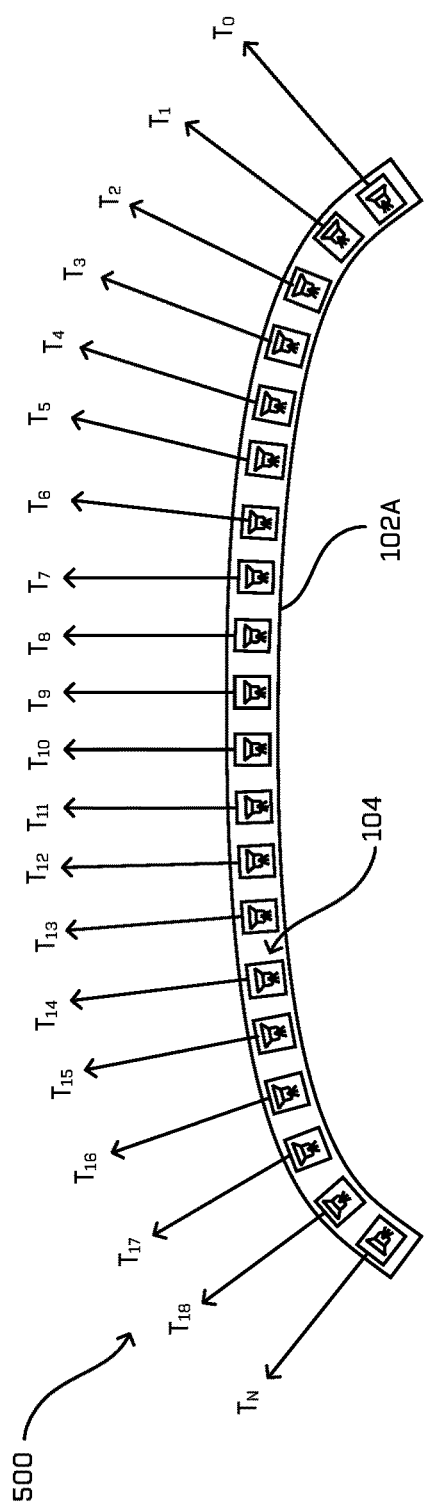
FIG. 5C illustrates yet another example of an acoustic notification that can be output via an acoustic array utilizing a multi-channel configuration.
Figure 5D:
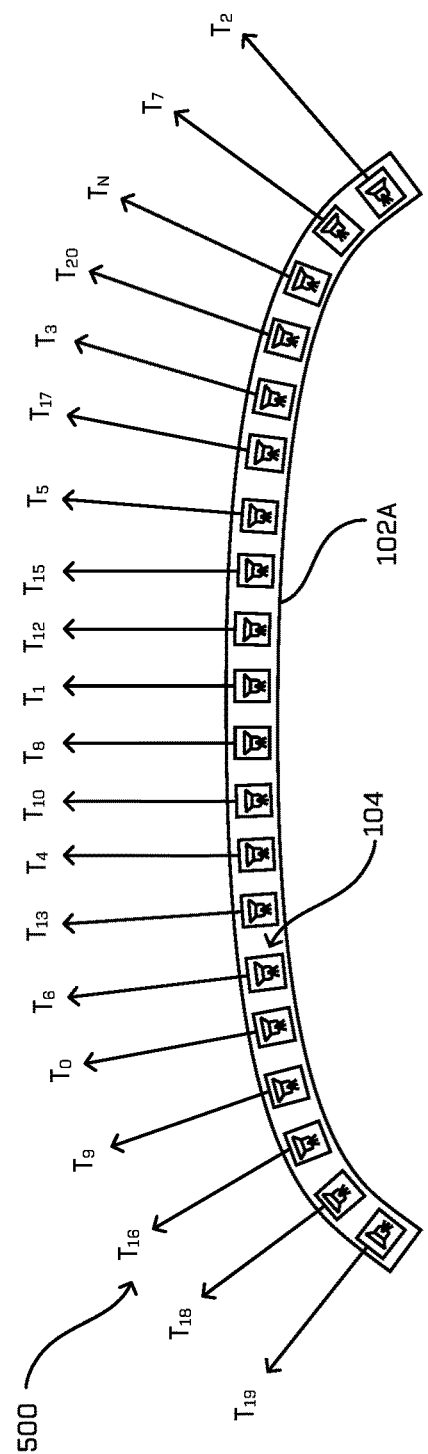
FIG. 5D illustrates another example of an acoustic notification that can be output via an acoustic array utilizing a multi-channel configuration.

As illustrated in FIG. 5B, sounds 500 are output by different channels, at a same time, such that a pedestrian can perceive the audio signal as linearly progressing across the surface of the vehicle 100. As such, the pedestrian can localize the vehicle 100, determine a size of the vehicle 100 (e.g., width, length, etc.), and, in some examples, determine a behavior of the vehicle 100 (as described above above). In at least one example, an acoustic notification can be played sequentially through all channels starting at one side of the vehicle and progressing to the opposite side, as illustrated in FIG. 5C. That is, the sounds 500 can be output one after another, moving in a direction across a surface of the vehicle 100 (e.g., right to left, left to right, front to back, back to front, etc.). The delay between each sound can be due to timing as indicated in the signal sent to each group of speaker(s) corresponding to each channel (e.g., from the audio output determination system 212). In some examples, each sound can be emitted for a particular period of time such that the audio signal can be perceived by a pedestrian as pulsating across the surface of the vehicle 100. In another example, an acoustic notification can include a plurality of sounds, having a same volume, that can be emitted at random times, as illustrated in FIG. 5D. That is, the sounds 500 can be output in a random order across a surface of the vehicle 100 (e.g., right to left, left to right, front to back, back to front, etc.).

In any of the examples illustrated and described in FIGS. 5A-5D, one or more audio characteristics can be varied with respect to each sound emitted from each channel.

Figure 6:
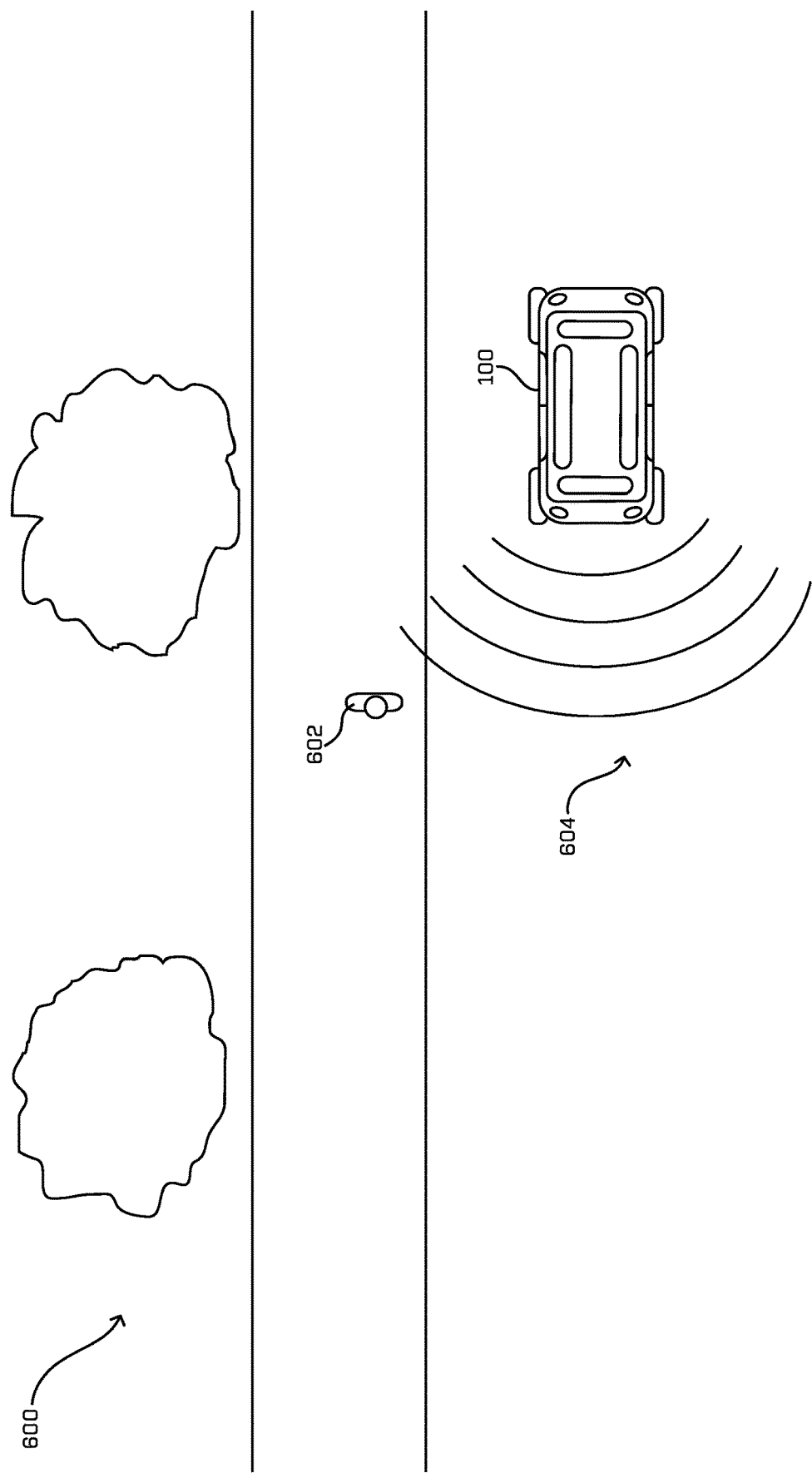
FIG. 6 illustrates an example of outputting an acoustic notification to alert a pedestrian, or other object, of a presence of a vehicle.

FIG. 6 illustrates an example of outputting an acoustic notification to alert a pedestrian of a presence of a vehicle 100. FIG. 6 illustrates a top view of an environment 600 within which the vehicle 100 is positioned. As illustrated, a pedestrian 602 is in the environment 600.

As described above, in at least one example, the audio output determination system 212 can send a first signal 400A to a first group of speaker(s) 402A, a second signal 400B to the second group of speaker(s) 402B, and so on. Responsive to receiving the signals 400, each group of speakers can emit a sound. In at least one example, the audio output determination system 212 can determine a timing for emitting the sound, a volume for emitting the sound, audio characteristics associated with emitting the sound, etc. via a particular channel, and can send such information to a group of speaker(s) associated with the particular channel. Each group of speakers corresponding to a channel in the multi-channel configuration can emit a sound based on the signal received, and as such, a plurality of sounds 604 can be spatialized across the surface of the vehicle 100, as illustrated in FIG. 6. That is, as illustrated in FIG. 6, the multi-channel configuration can be utilized to dynamically output sounds via individual channels such that the plurality of sounds can be spatialized across the surface of the vehicle 100 (e.g., as an acoustic notification to notify the pedestrian 602).

In some examples, the audio output determination system 212 can send signals 400 to the acoustic array 102A continuously, in near-real time, so long as the vehicle 100 is turned on (e.g., running). In such examples, the audio output determination system 212 can determine not to send signals 400 responsive to a stop event (e.g., velocity exceeds a threshold velocity, no object detection, presence in a particular location, etc.). In alternative examples, the audio output determination system 212 can send signals 400 to the acoustic array 102A responsive to a trigger event (e.g., velocity falls below a threshold velocity, object detection, location, etc.). In such examples, the default state may be to not send signals 400.

While the aforementioned examples are directed to providing acoustic notifications to a pedestrian, the same or similar techniques can be instituted for any other external objects detected in the environment 600 of the vehicle 100. Furthermore, while the aforementioned examples are directed to providing acoustic notifications via the acoustic array 102A, the same or similar techniques can be instituted for any other acoustic array 102B-102N of the vehicle 100.

Figure 7:
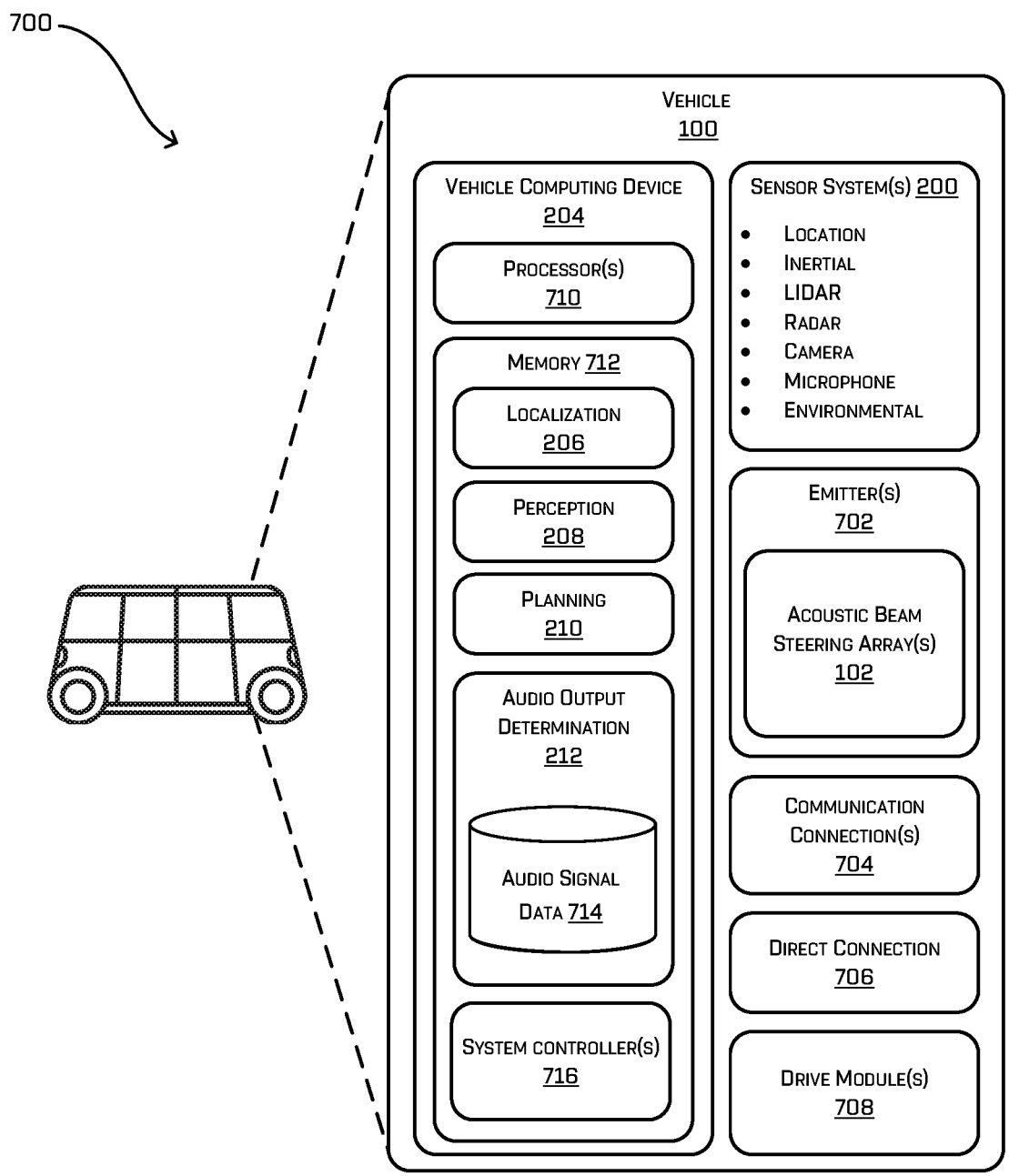
FIG. 7 illustrates a block diagram of an example system for facilitating acoustic notifications.

FIG. 7 illustrates a block diagram of an example system 700 for facilitating acoustic notifications. In at least one example, the system 700 can include the vehicle 100, as described above with reference to FIGS. 1-6.

Further, as described above, the vehicle 100 can include, one or more sensor systems 200, one or more emitters 702, one or more communication connections 704, at least one direct connection 706, and one or more drive modules 708.

The vehicle computing device(s) 204 can include one or more processors 710 and memory 712 communicatively coupled with the one or more processors 710. In the illustrated example, the vehicle 100 is an autonomous vehicle; however, the vehicle 100 could be any other type of vehicle, as described above. In the illustrated example, the memory 712 of the vehicle computing device(s) 204 stores the localization system 206, the perception system 208, the planning system 210, and the audio output determination system 212, as described above with reference to FIG. 2. In at least one example, the audio output determination system 212 can store an audio signal data storage 714, which can store one or more digital audio files corresponding to acoustic notifications. Each digital audio file can comprise one or more audio signals that, when emitted by speaker(s) 104 of an acoustic array 102A, can correspond to an acoustic notification. In some examples, the audio signal data storage 714 can be stored in association with another vehicle system and/or remotely. Furthermore, in some examples, audio signals can be stored and/or accessible via an external resource (e.g., the Cloud, the Internet, a data repository, etc.).

In at least one example, the vehicle computing device(s) 204 can include one or more system controllers 716, which can be configured to control steering, propulsion, braking, safety, emitters, communication, and other systems of the vehicle 100. These system controller(s) 716 can communicate with and/or control corresponding systems of the drive module(s) 708 and/or other components of the vehicle 100. In at least one example, the system controller(s) 716 can receive instructions from one or more other systems of the vehicle 100 (e.g., the planning system 210).

In at least one example, the sensor system(s) 200 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 200 can include multiple instances of each of these or other types of sensors. For instance, the LIDAR sensors can include individual LIDAR sensors located at the corners, front, back, sides, and/or top of the vehicle 100. As another example, the camera sensors can include multiple cameras disposed at various locations about the exterior and/or interior of the vehicle 100. The sensor system(s) 200 can provide input to the vehicle computing device(s) 204. Additionally and/or alternatively, the sensor system(s) 200 can send sensor data, via the one or more networks, to one or more computing device(s) at a particular frequency, after a lapse of a predetermined period of time, in near real-time, etc.

The vehicle 100 can also include one or more emitters 702 for emitting light and/or sound, as described above. The emitters 702 in this example include interior audio and visual emitters to communicate with passengers of the vehicle 100. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 702 in this example also include exterior emitters. By way of example and not limitation, the exterior emitters in this example include light emitters (e.g., indicator lights, signs, light arrays, projectors, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 702 can include one or more acoustic arrays 102, as described above. The emitters can be disposed at various locations about the exterior and/or interior of the vehicle 100.

The vehicle 100 can also include one or more communication connection(s) 704 that enable communication between the vehicle 100 and one or more other local or remote computing device(s). For instance, the communication connection(s) 704 can facilitate communication with other local computing device(s) on the vehicle 100 and/or the drive module(s) 708. Also, the communication connection(s) 704 can allow the vehicle to communicate with other nearby computing device(s) (e.g., other nearby vehicles, traffic signals, etc.). The communications connection(s) 704 also enable the vehicle 100 to communicate with a remote teleoperations computing device or other remote services.

The communications connection(s) 704 can include physical and/or logical interfaces for connecting the vehicle computing device(s) 204 to another computing device or a network. For example, the communications connection(s) 704 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

In at least one example, the vehicle 100 can include one or more drive modules 708. In some examples, the vehicle 100 can have a single drive module 708. In at least one example, if the vehicle 100 has multiple drive modules 708, individual drive modules 708 can be positioned on opposite ends of the vehicle 100 (e.g., the front and the rear, etc.). In at least one example, the drive module(s) 708 can include one or more sensor systems to detect conditions of the drive module(s) 708 and/or the surroundings of the vehicle 100. By way of example and not limitation, the sensor system(s) can include one or more wheel encoders (e.g., rotary encoders) to sense rotation of the wheels of the drive module, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 708. In some cases, the sensor system(s) on the drive module(s) 708 can overlap or supplement corresponding systems of the vehicle 100 (e.g., sensor system(s) 200).

The drive module(s) 708 can include many of the vehicle systems, including a high voltage battery, a motor to propel the vehicle 100, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 708 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 708. Furthermore, the drive module(s) 708 also include one or more communication connection(s) that enable communication by the respective drive module with one or more other local or remote computing device(s).

The processor(s) 710 of the vehicle 100 can be any suitable processor capable of executing instructions to process data and perform operations as described herein. By way of example and not limitation, the processor(s) 710 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 712 of the vehicle 100 is an example of non-transitory computer-readable media. The memory 712 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that, in alternative examples, components of the vehicle 100 can be associated with the remote computing device(s) and/or components of the remote computing device(s) can be associated with the vehicle 100. That is, the vehicle 100 can perform one or more other functions associated with remote computing device(s), and vice versa. Furthermore, in some examples, one or more functions performed by the vehicle computing device(s) 204 can be performed by one or more components of the acoustic arrays 102, and vice versa.

Figure 8:
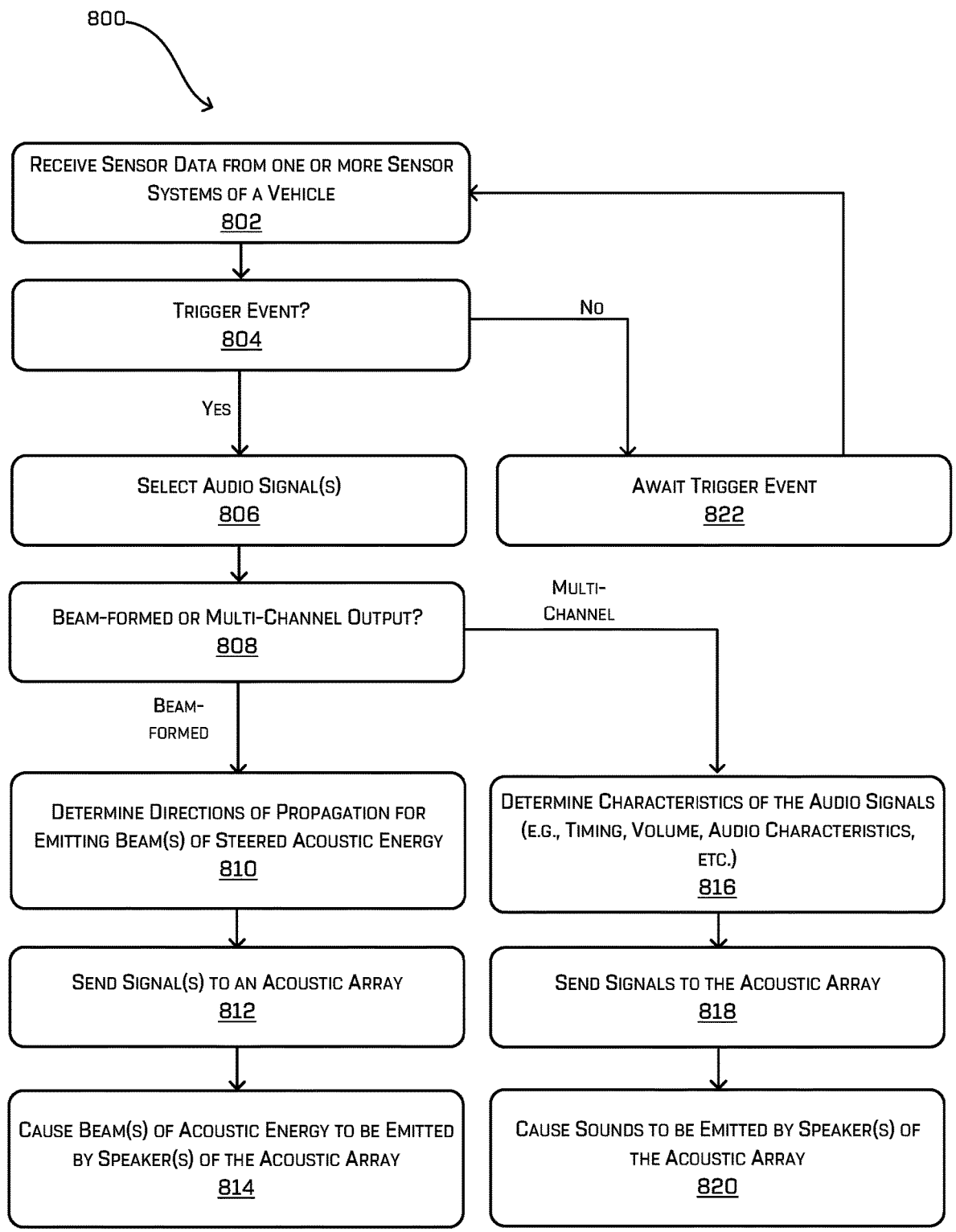
FIG. 8 illustrates a flow diagram illustrating an example process for facilitating acoustic notifications.
Figure 9:
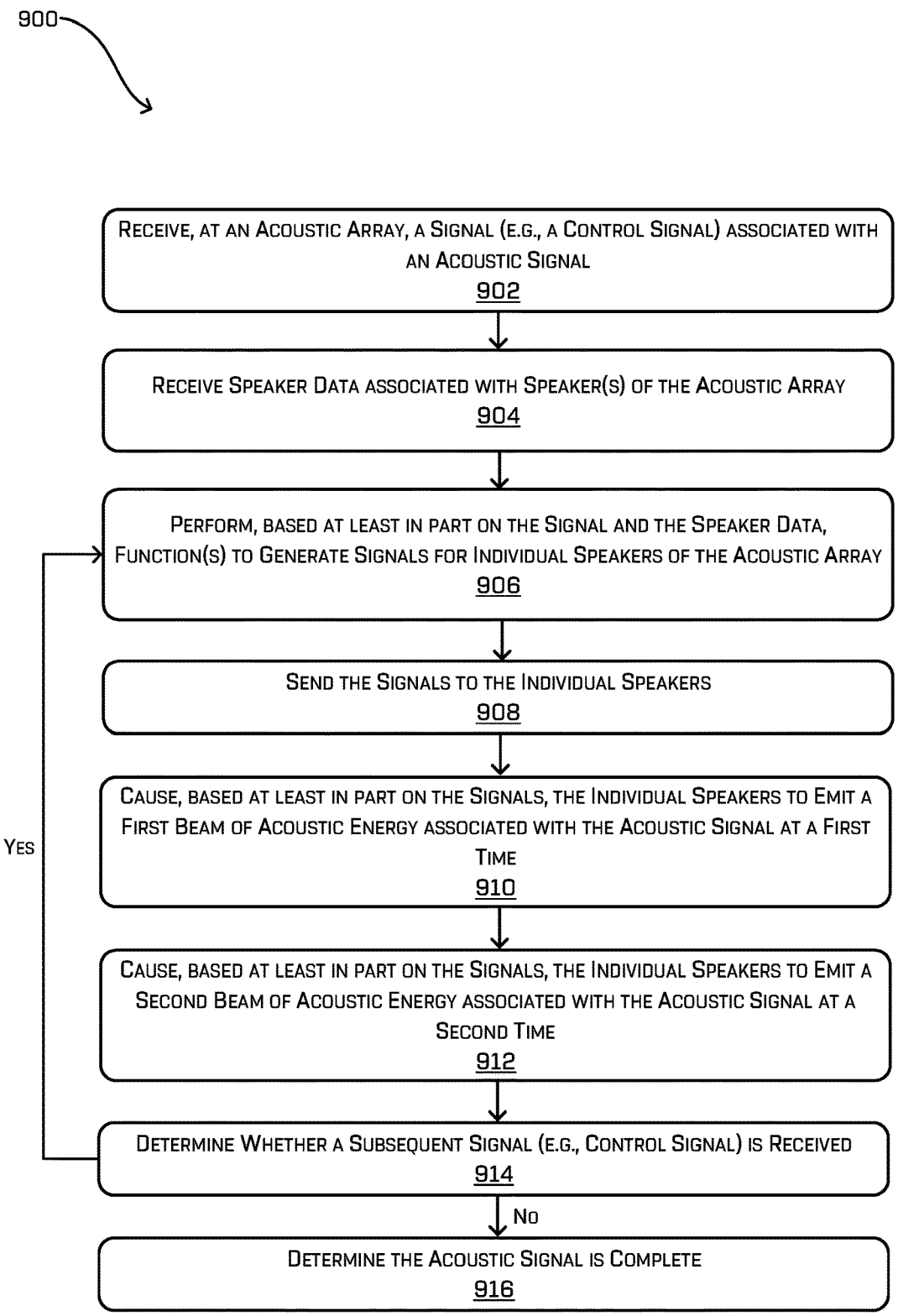
FIG. 9 illustrates a flow diagram illustrating an example process for causing beams of acoustic energy to be emitted by speakers of an acoustic array for providing a beam-formed acoustic notification.
Figure 10:
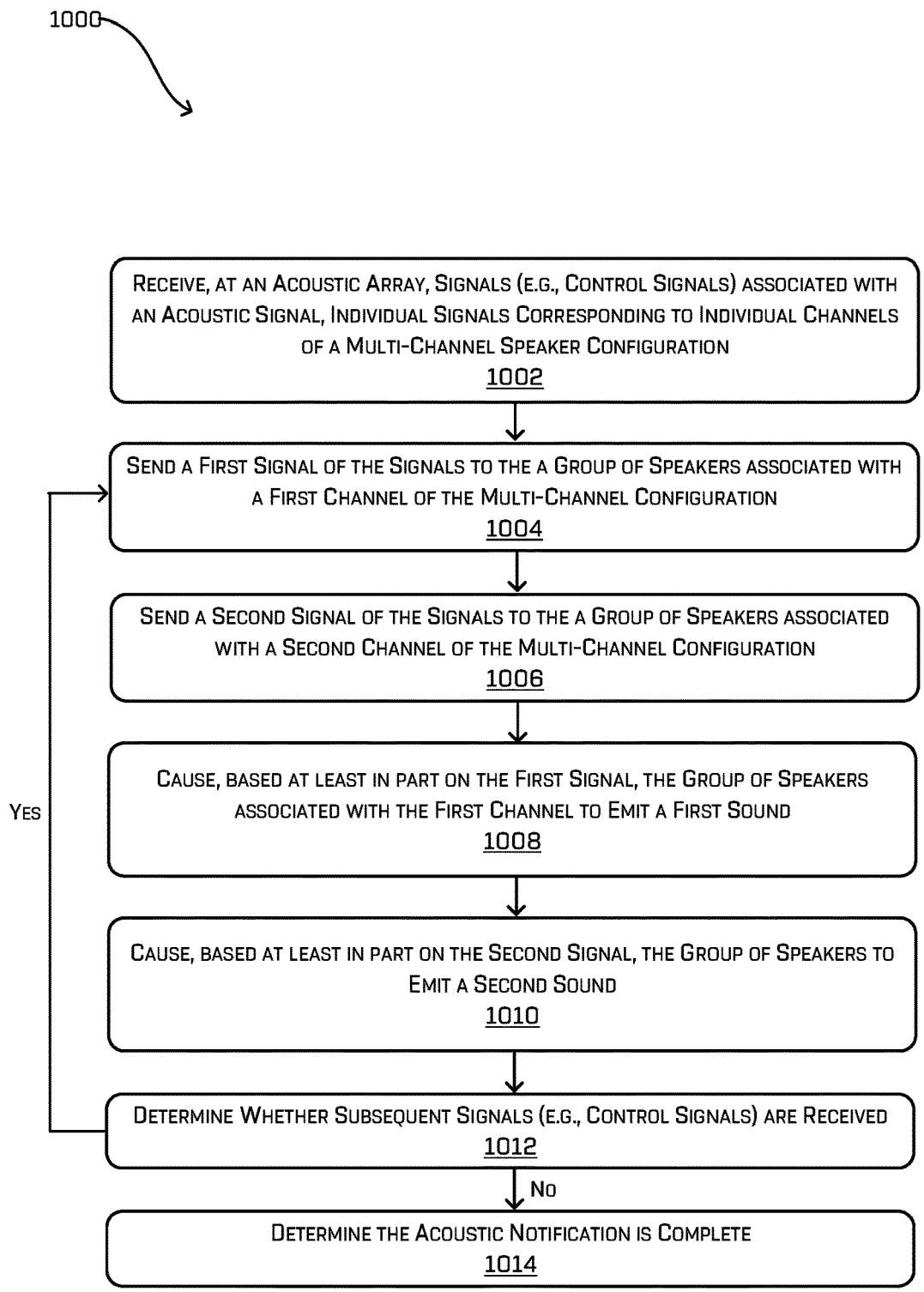
FIG. 10 illustrates a flow diagram illustrating another example process for causing sounds to be emitted by speakers of an acoustic array for a multi-channel acoustic notification.

FIGS. 8-10 are flowcharts showing example methods for using acoustic notifications for pedestrian notification as described herein. The methods illustrated in FIGS. 8-10 are described with reference to the vehicle 100 shown in FIGS. 1-7 for convenience and ease of understanding. However, the methods illustrated in FIGS. 8-10 are not limited to being performed using vehicle 100, and can be implemented using any of the other vehicles described in this application, as well as vehicles other than those described herein. Moreover, the vehicle 100 described herein is not limited to performing the methods illustrated in FIGS. 8-10.

The methods 800-1000 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 800-1000 can be combined in whole or in part with each other or with other methods.

FIG. 8 illustrates a flow diagram illustrating an example process 800 for causing beams of acoustic energy to be emitted by speakers of an acoustic array.

Block 802 illustrates receiving sensor data from the one or more sensor systems of a vehicle. As described above, in at least one example, the vehicle 100 can be associated with one or more sensor system(s) 200 that can be disposed on the vehicle 100. The one or more sensor system(s) 200 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, microphones, environmental sensors (e.g., temperature sensors, humidity sensors, light sensors, pressure sensors, etc.), etc. The one or more sensor system(s) 200 can generate sensor data 202, which can be utilized by the localization system 206, perception system 208, and/or planning system 210.

Block 804 illustrates determining whether a trigger event occurs. As described above, in at least one example, the audio output determination system 212 can utilize the sensor data and/or one or more outputs of the localization system 206, the perception system 208, and/or the planning system to determine when to send a signal (e.g., a control signal) to one or more acoustic arrays 102. In at least one example, the audio output determination system 212 can determine to send the signal responsive to determining an occurrence of a trigger event.

In some examples, a trigger event can correspond to an identification of a pedestrian (or other object) proximate the vehicle 100 (e.g., as determined by the perception system 208). In an additional or alternative example, a trigger event can correspond to a coincidence of a location of a pedestrian with one or more threshold locations in an environment (that is indicative of a potential collision or the pedestrian and the vehicle 100 coming within an unsafe distance of one another). In at least one example, the sensor system(s) 200 can generate sensor data 202 and provide such sensor data 202 to the vehicle computing device(s) 204. The localizer system 206 can analyze the sensor data 202 to determine local pose data (e.g., position, orientation estimation data) for the location of the vehicle 100 in the environment. In at least one example, the planning system 210 can determine a trajectory ($T_v$) of the vehicle 100. For instance, with reference to FIG. 3, the perception system 208 can process the sensor data 202 to detect a pedestrian 302 in the environment 300. In at least one example, the planning system 210 can estimate a trajectory ($T_p$) for the pedestrian 302. In at least one example, the planning system 210 can determine a location associated with where the pedestrian trajectory ($T_p$) and the vehicle trajectory ($T_v$) are likely to intersect (which, in some examples, may cause a collision between the vehicle 100 and the pedestrian 302 or cause the vehicle 100 to come within an unsafe distance of the pedestrian 302). In at least one example, the planning system 210 can estimate one or more threshold locations in the environment 300, at which to communicate an acoustic notification when the location of the pedestrian 302 coincides with the threshold locations along the pedestrian trajectory ($T_p$). The coincidence of the location of the pedestrian 302 and a threshold location can correspond to a trigger event.

Additionally or alternatively, in some examples, a trigger event can correspond to a velocity of the vehicle 100 being below a threshold. For instance, in at least one example, the sensor system(s) 200 can generate sensor data 202 and provide such sensor data 202 to the vehicle computing device(s) 204. The localizer system 206 can analyze the sensor data 202 to determine local pose data (e.g., position, orientation estimation data) for the location of the vehicle 100 in the environment. The planning system 210 can analyze the sensor data 202 and/or data output from the localizer system 206 to determine a velocity of the vehicle 100. The audio output determination system 212 can compare the velocity of the vehicle 100 with a threshold velocity. Based at least in part on the audio output determination system 212 determining that the velocity is below a threshold velocity, the audio output determination system 212 can determine an occurrence of a trigger event.

In at least one example, a trigger event can correspond to a detection of an object within a threshold distance of the vehicle 100. For instance, in at least one example, the sensor system(s) 200 can generate sensor data 202 and provide such sensor data 202 to the vehicle computing device(s) 204. The localizer system 206 can analyze the sensor data 202 to determine local pose data (e.g., position, orientation estimation data) for the location of the vehicle 100 in the environment. In at least one example, the perception system 208 can process the sensor data 202 to detect one or more objects in the environment. The planning system 210 can determine a distance between the vehicle 100 and the one or more objects. In at least one example, the audio output determination system 212 can compare the distance between the vehicle and the one or more objects with a threshold distance, and based at least in part on determining that the distance is below the threshold distance, can determine an occurrence of a trigger event.

Further, in at least one example, a trigger event can correspond to a location of the vehicle 100. For instance, in at least one example, the sensor system(s) 200 can generate sensor data 202 and provide such sensor data 202 to the vehicle computing device(s) 204. In at least one example, the localizer system 206 can determine where the vehicle 100 is in relation to a local and/or global map based at least in part on sensor data 202 received from the sensor system(s) 200 and/or map data associated with a map. In some examples, the audio output determination system 212 can utilize a location of the vehicle 100 to determine an occurrence of a trigger event. For instance, if the location of the vehicle 100 corresponds to a particular location (or a particular geofence), the audio output determination system 212 can determine an occurrence of a trigger event.

Additional or alternative trigger events are contemplated herein. For instance, in at least one example, actuation of the vehicle 100 (e.g., turning the vehicle 100 on) can correspond to an occurrence of a trigger event.

Block 806 illustrates selecting audio signal(s). In at least one example, the audio output determination system 212 can access audio signal data (e.g., from an audio signal data storage (e.g., one or more digital audio files), an external resource (e.g., the Cloud, the Internet, a data repository, etc.), etc.) and select an audio signal that is to be output as an acoustic notification. That is, the audio output determination system 212 can select data representing an audio signal that can be used to generate the acoustic notification using one or more of the acoustic arrays 102. Different audio signals can be representative of different information (e.g., threat levels, etc.). In some examples, an acoustic notification can be associated with multiple audio signals.

Block 808 illustrates determining whether an acoustic notification is a beam-formed output or a multi-channel output. In at least one example, the audio output determination system 212 can output different types of control signals depending on whether an acoustic notification is associated with a beam-formed output or a multi-channel output. For instance, as described above in FIG. 2, in at least one example, the audio output determination system 212 can be configured to determine when to send a single signal (e.g., signal 214) to the one or more acoustic arrays 102. That is, the audio output determination system 212 can send a single control signal, which can be output by different speaker(s) 104 in different ways. In FIG. 4, however, the audio output determination system 212 can be configured to determine when to send multiple signals (e.g., signals 400) to individual channels of the one or more acoustic arrays 102. That is, in FIG. 4, the audio output determination system 212 can send multiple signals 400 that can be output by different channels(s) of speakers in different ways. In at least one example, the digital audio file associated with the selected audio signal(s) can indicate whether an output is a beam-formed output or a multi-channel output.

Block 810 illustrates determining directions of propagation for emitting beam(s) of steered acoustic energy. In at least one example, for instance, if the acoustic notification is associated with a beam steering output, the audio output determination system 212 can determine one or more directions of propagation for one or more outputs associated with the acoustic notification. In at least one example, the audio output determination system 212 can determine a target location (e.g., corresponding to a location of a target object) for outputting a beam of acoustic energy and can calculate a coordinate (e.g., an angle or other direction of emission) for a direction of propagation of a beam of acoustic energy. For instance, the audio output determination system 212 can determine the coordinate based on a predetermined reference point on the vehicle 100 and/or on another predetermined reference point on the acoustic array 102A. As one example, if a predetermined reference point has coordinates $(X_a, Y_a)$, a processor, circuitry, an algorithm or some combination of the foregoing can calculate the coordinate for the beam of acoustic energy (e.g., based on trigonometric analysis) relative to a vehicle trajectory.

In some examples, one or more beams of acoustic energy can be output in one or more directions. In such examples, the audio output determination system 212 can determine one or more directions of propagation. That is, in such examples, each beam of acoustic energy can have a different coordinate (e.g., an angle or other direction of emission) relative to the vehicle trajectory. In some examples, the offset between directions of propagation can be determined based on an extent of a target object (e.g., height, length, width, etc.), a pose of a target object (e.g., position, orientation, etc.), a distance between the target object and the vehicle 100, an angle of the target object relative to the vehicle 100 (e.g., angle from a normal of the vehicle 100), a type of message to be communicated, etc. In some examples, the one or more directions of propagation can be agnostic to a target location and instead can be indicated by a digital audio file associated with an acoustic notification.

In some examples, the audio output determination system 212 can determine a timing associated with outputting one or more beams of acoustic energy associated with an audio notification.

Block 812 illustrates sending signal(s) to an acoustic array. In at least one example, such as when an acoustic notification is associated with a beam-formed output, the audio output determination system 212 can be configured to send signal(s) to an acoustic array 102A-102N. In at least one example, the signal(s) can be control signal(s) associated with a trigger signal and can include data such as an audio signal selected, direction(s) of propagation for emitting one or more beams of acoustic steered energy, and/or a timing for emitting the one or more beams of acoustic steered energy. In at least one example, the signal(s) can further include modulation signal data received by acoustic arrays 102.

In at least one example, the audio output determination system 212 can send the signal(s) to an acoustic array, such as acoustic array 102A, to activate the acoustic array 102A. In at least one example, the audio output determination system 212 can send the signal(s) to the acoustic array that is positioned approximately in the direction of the target object (e.g., if the target object is in front of the vehicle 100, the audio output determination system 212 can send the signal(s) to the acoustic array 102A). As described above, in at least one example, the acoustic array 102A can include one or more processors 106 (e.g., microprocessor(s), digital signal processor(s) (DSP), etc.) that can be configured to receive the signal and process the signal to generate, using the acoustic array 102A, a beam of steered acoustic energy into an environment within which the vehicle 100 is positioned.

As described above, the acoustic array 102A can include several speaker(s) 104, with each speaker in the acoustic array 102A being coupled with an output amplifier. Each amplifier can include a gain input and a signal input. The processor(s) 106 can perform function(s) 108 to calculate data representing a gain for the gain input of each amplifier and can calculate data representing a signal delay for the signal input of each amplifier. As described above, the processor(s) 106 can access and/or or receive speaker data representing information on the speaker(s) 104 (e.g., from an internal and/or external data source). Responsive to receiving the signal, the processor(s) 106 can perform the function(s) 108, based on the speaker data, and can send signals to each of the speaker(s) 104. Each of the speaker(s) 104 can emit acoustic energy based on the signals, thereby emitting a beam of steered acoustic energy, as illustrated in block 814. The foregoing description of techniques for emitting a beam of acoustic energy are described in the context of a single beam of acoustic energy. However, in additional or alternative examples, the same or similar techniques can be implemented to output any number of beams of acoustic energy, as described above with reference to FIGS. 3A and 3B and below with reference to FIG. 9.

Block 816 illustrates determining characteristics of the audio signal(s). In at least one example, such as where the acoustic notification is associated with a multi-channel output, the audio output determination system 212 can determine a timing for emitting one or more sounds, a volume for emitting one or more sounds, audio characteristics (e.g., a frequency, a volume, a pitch, a tone, a duration, etc.) for emitting one or more sounds, etc. That is, in such an example, the audio output determination system 212 can determining a timing, a volume, or audio characteristics associated with the audio signals(s) such to vary the timing, the volume, or the audio characteristics associated with the sounds output based on the audio signal(s).

Block 818 illustrates sending signal(s) to the acoustic array. In at least one example, for instance, in when an acoustic notification is associated with a multi-channel output, the audio output determination system 212 can send multiple signals that can be output by different channels(s) of speakers in different ways. For instance, with reference to FIG. 4, the audio output determination system 212 can send a first signal 400A to a first group of speaker(s) 402A, a second signal 400B to the second group of speaker(s) 402B, and so on. Each signal 400A-400N can include data indicating an audio signal, a time associated with outputting the audio signal, a volume associated with outputting the audio signal, audio characteristics associated with outputting the audio signal, etc. In at least one example, individual signals (e.g., signal 400A, signal 400B, etc.) can be associated with a same audio signal or different audio signals, which can be associated with a same digital audio file. That is, in at least one example, each signal 400A-400N can be associated with an audio signal that, when collectively emitted, comprises an acoustic notification corresponding to a digital audio file. Responsive to receiving the signals 400, each group of speakers 402A-402N can emit a sound. In at least one example, responsive to receiving a signal 400A, the first group of speaker(s) 402A can a sound 404A, responsive to receiving a signal 400B, the second group of speaker(s) 402B can emit a sound 404B, and so on. That is, responsive to receiving the signals 400, the individual channels of the multi-channel configuration can cause sounds to be emitted by one or more speaker(s) of the acoustic array 102A, as illustrated in block 820.

Returning to block 804, responsive to determining that a trigger event has not occurred, the audio output determination system 212 can continue to receive and analyze sensor data and/or data received from one or more other systems of the vehicle 100 to determine an occurrence of a trigger event. That is, the audio output determination system 212 can await a trigger event, as illustrated in block 822.

FIG. 9 illustrates a flow diagram illustrating another example process 900 for causing beams of acoustic energy to be emitted by speakers of an acoustic array.

Block 902 illustrates receiving, at an acoustic array, a signal (e.g., a control signal) associated with an acoustic notification. As described above, in at least one example, the audio output determination system 212 can send a signal to one or more acoustic arrays 102. In at least one example, the signal can be associated with a trigger signal and can include data such as an audio signal selected, direction(s) of propagation for emitting one or more beams (e.g., the first beam 304A and the second beam 304B) of acoustic steered energy, and/or a timing (e.g., frequency) for emitting the one or more beams of acoustic steered energy. In such an example, the acoustic array 102A can receive the signal. For instance, in at least one example, the processor(s) 106 can receive the signal.

In at least one example, the signal can indicate that the acoustic notification corresponds to a multi-beam output wherein a first beam of acoustic energy is emitted at a first time and a second beam of acoustic energy is emitted at a second time. In at least one example, an amount of time between the first time and the second time can be indicated in the signal. In at least one example, the first time and the second time can be output with a time delay (e.g., 100 ms, etc.) such that the first beam of acoustic energy and the second beam of acoustic energy are perceived by the target object to be contiguous.

In at least one example, the first beam of acoustic energy is offset from the second beam of acoustic energy, as described below. That is, in at least one example, the first beam of acoustic energy can be associated with a first direction of propagation and the second beam of acoustic energy can be associated with a second direction of propagation. In some examples, angles between directions of propagation can be determined based on an extent of a target object (e.g., height, length, width, etc.), a pose of a target object (e.g., position, orientation, etc.), a distance between the target object and the vehicle 100, an angle of the target object relative to the vehicle 100 (e.g., angle from a normal of the vehicle 100), a type of message to be communicated, etc. In at least one example, the first direction of propagation and the second direction of propagation can be included in the signal.

Block 904 illustrates receiving speaker data associated with speaker(s) of the acoustic array. In at least one example, the processor(s) 106 of the acoustic array 102A can access and/or or receive data (e.g., speaker data) representing information on the speaker(s) 104 (e.g., from an internal and/or external data source) and the information can include, but is not limited to, array width, speaker spacing in the acoustic array 102A, a wave front distance between adjacent speakers in the acoustic array 102A, a number of speakers in the acoustic array 102A, speaker characteristics (e.g., frequency response, output level per watt of power, etc.), etc.

Block 906 illustrates performing, based at least in part on the signal and the speaker data, function(s) to generate signals for individual speakers of the acoustic array. In at least one example, the processor(s) 106 can implement function(s) 108 to operate the acoustic array 102A, as described above. The function(s) 108 can be implemented in hardware, software, or a combination thereof (e.g., processor(s) 106, computer-readable media executable by the processor(s) 106, etc.), and the function(s) 108 implemented can include, but are not limited to, a delay calculator, a gain calculator, a beam steering algorithm, an adaptive beam steering algorithm, an environment compensator, an audio signal modulator, an ambient noise compensator, and a signal converter. Furthermore, in some examples, the processor(s) 106 can utilize additional or alternative signal(s), such as object pose, microphone signal(s), environmental signal(s), audio signals, etc. for determining how to emit the beams of steered acoustic energy for effectuating the acoustic notification.

In at least one example, when the acoustic array 102A is in an arbitrary array configuration, the processor(s) 106 can utilize the function(s) 108 described above; however, the function(s) 108 can additionally include Lagrange filter coefficients as applied to gains and a taper function (e.g., Nuttall), which can be centered in a direction of a beam, to determine time delays for outputting audio signals.

Block 908 illustrates sending the signals to the individual speakers. Based at least in part on performing the function(s) 108, the processor(s) 106 can send individual signals to one or more of the speakers 104. In at least one example, an individual signal can indicate at least a gain for the gain input of an individual amplifier and data representing a signal delay for the signal input of the amplifier. In at least one example, the processor(s) 106 can send a first set of signals corresponding to a first beam of acoustic energy and a second set of signals corresponding to a second beam of acoustic energy.

Block 910 illustrates causing, based at least in part on the signals, the individual speakers to emit a first beam of acoustic energy associated with the acoustic notification at a first time. In at least one example, the speaker(s) 104 can emit acoustic energy based on a first group of signals corresponding to a first beam of acoustic energy, thereby emitting a first beam of steered acoustic energy. The speaker(s) 104 can emit the first beam of steered acoustic energy associated with a particular audio signal in a first direction of propagation at a first time based on the first set of signals received from the processor(s) 106.

Block 912 illustrates causing, based at least in part on the signals, the individual speakers to emit a second beam of acoustic energy associated with the acoustic notification at a second time. In at least one example, the speaker(s) 104 can emit acoustic energy based on a second group of signals corresponding to a second beam of acoustic energy, thereby emitting a second beam of steered acoustic energy. The speaker(s) 104 can emit the second beam of steered acoustic energy associated with a particular audio signal in a second direction of propagation at a second time based on the second set of signals received from the processor(s) 106.

Returning to FIG. 3, in at least one example, the acoustic array 102A can emit the first beam 304A indicative of the data representing the selected audio signal (e.g., the acoustic energy reproduces the sound encoded in the audio signal), along the first direction of propagation at the first time ($T_0$), and can emit the second beam 304B indicative of the data representing the selected audio signal, along the second direction of propagation at the second time ($T_1$). That is, at least a portion of the speaker(s) 104 can emit the first beam 304A indicative of the data representing the selected audio signal (e.g., the acoustic energy reproduces the sound encoded in the audio signal), along the first direction of propagation at the first time ($T_0$), and at least a portion of the speaker(s) 104 can emit the second beam 304B indicative of the data representing the selected audio signal, along the second direction of propagation at the second time ($T_1$). In some examples, the portions of speaker(s) 104 can be the same speakers in the acoustic beam forming array 102A and, in other examples, the portions of speaker(s) 104 can be different speakers in the acoustic beam forming array 102A. In any of the examples described herein, emitting the first beam 304A at the first time and the second beam 304B at a second time may comprise (i.e., comprises in some examples) sweeping from the first direction to the second direction (e.g., in a continuous or discrete manner).

Block 914 illustrates determining whether a subsequent signal (e.g., control signal) is received. In some examples, the audio output determination system 212 can send one or more subsequent signals 214 to the acoustic array 102A to cause the speaker(s) 104 oscillate between emitting the first beam 304A and the second beam 304B in their respective directions of propagation at a defined frequency (e.g., 10 Hz or 100 ms) such that the acoustic notification is perceived by the pedestrian 302 as moving side to side (e.g., wiggling) for a sustained amount of time. In such examples, the audio output determination system 212 can determine a frequency for sending the subsequent signals, which corresponds to a rate at which the first beam 304A and the second beam 304B are subsequently emitted from the one or more acoustic arrays 102. That is, in at least one example, the audio output determination system 212 can determine a frequency at which the pedestrian 302 hears the acoustic notification move from side to side repeatedly and subsequent beams of steered acoustic energy can be output in the first direction of propagation and the second direction of propagation at such frequency. In at least one example, the subsequent signals can include updated directions of propagation and or timing, which can be based on updated sensor data 202 received by the vehicle computing device(s) 204. That is, as the vehicle 100 and/or the pedestrian 302 move, the audio output determination system 212 can update the directions of propagation and/or timing at which additional beams of acoustic energy are to be output by the acoustic array 102A.

Based at least in part on determining that a subsequent signal has been received, process 900 can return to block 906 to repeat the process with the subsequent signal to cause the speaker(s) 104 to emit additional beams of acoustic energy (e.g., in their respective directions of propagation and at their respective times) continuously such that the acoustic notification is perceived by the target object as moving side to side (e.g., wiggling) for a sustained amount of time.

Block 916 illustrates determining that the acoustic notification is complete. If the acoustic array 102A does not receive subsequent signals, it can determine that the acoustic notification is complete.

FIG. 10 illustrates a flow diagram illustrating yet another example process 1000 for causing sounds to be emitted by speakers of an acoustic array for an acoustic notification.

Block 1002 illustrates receiving, at an acoustic array, signals (e.g., control signals) associated with an acoustic notification, individual of the signals corresponding to individual channels in a multi-channel speaker configuration. As described above, in at least one example, the audio output determination system 212 can send signals to one or more acoustic arrays 102. In at least one example, each of the signals can be associated with a trigger signal and can include data such as an audio signal selected, a timing for emitting one or more sounds associated with the audio signal, volume associated with emitting one or more sounds associated with the audio signal, audio characteristics associated with emitting the one or more sounds associated with the audio signal, etc. In such an example, the acoustic array 102A can receive the signals. In at least one example, each signal can be sent to a different channel in a multi-channel speaker configuration.

Block 1004 illustrates sending a first signal of the signals to the group of speakers associated with a first channel of the multi-channel configuration. Based at least in part on receiving the signals, the processor(s) 106 can send a first signal of the signals to a first channel of a multi-channel speaker configuration. In at least one example, the processor(s) 106 can perform one or more of the function(s) 108 prior to sending the first signal to the first channel.

Block 1006 illustrates sending a second signal of the signals to the group of speakers associated with a second channel of the multi-channel configuration. Based at least in part on receiving the signals, the processor(s) 106 can send a second signal of the signals to a second channel of a multi-channel speaker configuration. In at least one example, the processor(s) 106 can perform one or more of the function(s) 108 prior to sending the second signal to the second channel.

Block 1008 illustrates causing, based at least in part on the first signal, the group of speakers associated with the first channel to emit a first sound. In at least one example, the speaker(s) 104 corresponding to the first channel can emit a first sound based on the first signal.

Block 1010 illustrates causing, based at least in part on the second signal, the group of speakers associated with the second channel to emit a second sound. In at least one example, the speaker(s) 104 corresponding to the second channel can emit a second sound based on the second signal. As described above with reference to FIGS. 5A-5D, in at least one example, the individual channels can output sounds at different times, at different volumes, with different audio characteristics, etc. to cause the sounds to be output dynamically. In some examples, the sounds can be the same audio signal or different audio signals.

Block 1012 illustrates determining whether subsequent signals (e.g., control signals) are received. In some examples, the audio output determination system 212 can send one or more subsequent signals to the acoustic array 102A to cause the speaker(s) 104 to emit additional sounds such that the acoustic notification is emitted for a sustained amount of time. Based at least in part on determining that a subsequent signal has been received, process 1100 can return to block 1104 to repeat the process with the subsequent signal to cause the speaker(s) 104 to emit additional sounds such that the acoustic notification is emitted for a sustained amount of time. In such examples, the audio output determination system 212 can determine a frequency for sending the subsequent signals, which corresponds to a rate at which the additional sounds are subsequently emitted from the acoustic array 102A. In an alternate example, the signals can include instructions to continuously emit the additional sounds such that the acoustic notification is output for a sustained amount of time (e.g., which can correspond to a predetermined period of time or the receipt of a stop signal).

Block 1014 illustrates determining that the acoustic notification is complete. If the acoustic array 102A does not receive subsequent signals, it can determine that the acoustic notification is complete.

As noted above, wherein an acoustic array is identified as acoustic array 102A, any other acoustic array 102B-102N can be used for emitting particular beams of acoustic energy.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A. A system comprising: a sensor; an acoustic array disposed on an exterior surface of a vehicle, the acoustic array comprising a plurality of speakers configured to output audio; one or more processors; and one or more non-transitory computer-readable media storing instructions that, when executed by the one or more processors, cause the system to perform operations comprising: receiving, from the sensor, sensor data indicative of a pedestrian; determining, based at least in part on the sensor data, a pedestrian position; determining, based at least in part on the sensor data, a first direction of propagation to emit a first beam of acoustic energy, the first direction of propagation directing the first beam of acoustic energy towards a first position relative to the pedestrian position; causing, at a first time, at least a first portion of the plurality of speakers to emit the first beam of acoustic energy indicative of an alert in the first direction of propagation; determining, based at least in part on the sensor data, a second direction of propagation to emit a second beam of acoustic energy, the second direction of propagation directing the second beam of acoustic energy towards a second position relative to the pedestrian; and causing, at a second time, at least a second portion of the plurality of speakers to emit the second beam of acoustic energy indicative of the alert in the second direction of propagation, the first beam of acoustic energy and the second beam of acoustic energy, when perceived by the pedestrian, enabling the pedestrian to localize the vehicle.

B. The system as paragraph B recites, wherein a difference between the first direction of propagation and the second direction of propagation is based at least in part on an extent of the pedestrian.

C. The system as any of paragraphs A-B recite, operations further comprise: causing at least a third portion of the plurality of speakers to emit a third beam of acoustic energy indicative of the alert in the first direction at a third time; and causing the at least a fourth portion of the plurality of speakers to emit a fourth beam of acoustic energy indicative of the alert in the second direction of propagation at a fourth time.

D. The system as any of paragraphs A-C recite, operations further comprising: determining, based at least in part on the sensor data, a predicted intersection point of a pedestrian trajectory of the pedestrian and a vehicle trajectory of the vehicle; and determining the first direction of propagation and the second direction of propagation based at least in part on determining the predicted intersection point is within a threshold distance of the vehicle.

E. The system as any of paragraphs A-D recite, wherein the plurality of speakers are arranged in an arbitrary configuration.

F. One or more non-transitory computer-readable media storing instructions that, when executed by one or more processors, cause the one or more processors to perform operations comprising: receiving, from a sensor associated with a vehicle, sensor data associated with an object; determining, based at least in part on the sensor data, first data for emitting a first beam of acoustic energy via a first portion of a plurality of speakers of an acoustic array; determining, based at least in part on the sensor data, second data for emitting a second beam of acoustic energy via a second portion of the plurality of speakers of the acoustic array; causing, at a first time and based at least in part on the first data, the first portion of the plurality of speakers to emit the first beam of acoustic energy in a first direction relative to the object; and causing, at a second time and based at least in part on the second data, the second portion of the plurality of speakers to emit the second beam of acoustic energy in a second direction relative to the object, the first direction differing from the second direction by an offset.

G. The one or more non-transitory computer-readable media as paragraph F recites, wherein the operations further comprise: determining, based at least in part on the sensor data, a distance between an object position of the object and a vehicle position of the vehicle, wherein the offset is based at least in part on the distance.

H. The one or more non-transitory computer-readable media as any of paragraphs F-G recite, wherein the operations further comprise: determining, based at least in part on the sensor data, an angle between an object position of the object and a vehicle position of the vehicle, wherein the offset is based at least in part on the angle.

I. The one or more non-transitory computer-readable media as any of paragraphs F-H recite, wherein the operations further comprise: determining, as an extent of the object and based at least in part on the sensor data, one or more of a length, width, or height of the object, wherein the offset is based at least in part on the extent of the object.

J. The one or more non-transitory computer-readable media as any of paragraphs F-I recite, wherein the first direction is associated with a first side of the object and the second direction is associated with a second side of the object.

K. The one or more non-transitory computer-readable media as any of paragraphs F-J recite, wherein the operations further comprise: causing the at least the first portion of the plurality of speakers to emit a third beam of acoustic energy in the first direction at a third time; and causing the at least the second portion of the plurality of speakers to emit a fourth beam of acoustic energy in the second direction of propagation at a fourth time.

L. The one or more non-transitory computer-readable media as paragraph K recites, wherein the second time differs from the first time by a delay period, the third time differs from the second time by the delay period, and the fourth time differs from the third time by the delay period.

M. The one or more non-transitory computer-readable media as paragraph K recites, wherein the operations further comprise: receiving, from the sensor, updated sensor data; and updating at least one of the first direction of propagation or the second direction of propagation based on the updated sensor data for emissions of the third or fourth beams of acoustic energy.

N. A method comprising: receiving, from a sensor associated with a vehicle, sensor data associated with an object in an environment of the vehicle; determining, based at least in part on the sensor data, first data for emitting a first beam of acoustic energy via a first portion of a plurality of speakers of an acoustic array associated with the vehicle; determining, based at least in part on the sensor data, second data for emitting a second beam of acoustic energy via a second portion of the plurality of speakers of the acoustic array; causing, at a first time and based at least in part on the first data, the first portion of the plurality of speakers to emit the first beam of acoustic energy at a first angle relative to the vehicle; and causing, at a second time and based at least in part on the second data, the second portion of the plurality of speakers to emit the second beam of acoustic energy at a second angle relative to the vehicle, wherein a difference between the first angle and the second angle comprise an offset.

O. The method as paragraph N recites, wherein the object is a pedestrian, and wherein the first time and the second time are within a threshold amount of time such that the pedestrian is able to localize the vehicle.

P. The method as any of paragraphs N-O recite, further comprising: determining, based at least in part on the sensor data, a predicted intersection point of an object trajectory of the object and a vehicle trajectory of the vehicle; determining that the predicted intersection point is within a threshold distance of the vehicle; and determining the first data and the second data responsive to determining the predicted intersection point is within the threshold distance of the vehicle.

Q. The method as any of paragraphs N-P recite, further comprising: determining, based at least in part on the sensor data, at least one of an extent of the object or a pose of the object; determining the first angle based on at least one of the extent of the object or the pose of the object; and determining the second angle based on at least one of the extent of the object or the pose of the object.

R. The method as any of paragraphs N-Q recite, further comprising: causing the first portion of the plurality of speakers to emit a third beam of acoustic energy at the first angle at a third time; and causing the second portion of the plurality of speakers to emit a fourth beam of acoustic energy at the second angle at a fourth time.

S. The method as any of paragraphs N-R recite, wherein the first time differs from the second time by a delay period, and wherein the third time differs from the fourth time by the delay period.

T. The method as any of paragraphs N-S recite, further comprising: determining, based at least in part on the sensor data, a distance between the object and the vehicle, an angle between the object and the vehicle, or a type of information to be communicated to the object, wherein the offset is based at least in part on the distance between the object and the vehicle, the angle between the object and the vehicle, or the type of information to be communicated to the object.

U. A system comprising: an acoustic array disposed on at least one exterior surface of a vehicle, the acoustic array comprising a plurality of speakers configured for multi-channel functionality; one or more processors; and one or more non-transitory computer-readable media storing instructions that, when executed by the one or more processors, cause the system to perform operations comprising: determining a first signal for emitting a first sound via at least a first speaker of the plurality of speakers; determining a second signal for emitting a second sound via at least a second speaker of the plurality of speakers, the second speaker being associated with a different channel than the first speaker; causing, based at least in part on the first signal, the first speaker to emit the first sound; and causing, based at least in part on the second signal, the second speaker to emit the second sound, the first sound and the second sound being spatialized across the at least one exterior surface of the vehicle such that, when perceived by a pedestrian, the pedestrian is capable of perceiving a surface boundary of the vehicle.

V. The system as paragraph U recites, wherein the operations further comprise: determining a first time to emit the first sound; determining a second time to emit the second sound; causing the first speaker to emit the first sound at the first time; and causing the second speaker to emit the second sound at the second time.

W. The system as paragraph V recites, wherein the first time and the second time are a same time.

X. The system as paragraph V recites, wherein the first sound and the second sound are same audio signals or different audio signals.

Y. The system as any of paragraphs U-X recite, wherein the operations further comprise: determining a first audio characteristic associated with the first sound; and determining a second audio characteristic associated with the second sound, wherein the first audio characteristic and the second audio characteristic comprise a pitch, a duration, a tone, or a timber.

Z. The system as any of paragraphs U-Y recite, wherein the operations further comprise: determining a first volume to emit the first sound; determining a second volume to emit the second sound; causing the first speaker to emit the first sound at the first volume; and causing the second speaker to emit the second sound at the second volume.

AA. The system as any of paragraphs U-Z recite, wherein the operations further comprise: receiving, from a sensor on the vehicle, sensor data associated with an environment of the vehicle; determining, based at least in part on the sensor data, a velocity of the vehicle; determining that the velocity is below a threshold velocity; and causing the first speaker to emit the first sound and the second speaker to emit the second sound based at least in part on determining that the velocity is below the threshold velocity.

AB. The system as paragraph AA recites, wherein the operations further comprise causing at least portions of the plurality of speakers to dynamically emit sounds until the velocity is determined to meet or exceed the threshold velocity.

AC. A method comprising: determining a plurality of signals for dynamically emitting a plurality of sounds via a plurality of speakers associated with an acoustic array disposed on a vehicle, wherein each signal of the plurality of signals is emitted from at least one speaker of the plurality of speakers that is associated with a particular channel of a plurality of channels; and causing a portion of the plurality of speakers to dynamically emit the plurality of sounds, the plurality of sounds being spatialized across at least one surface of the vehicle such that, when the plurality of sounds are output via the portion of the plurality of speakers, the plurality of sounds convey information associated with a geometry of the vehicle.

AD. The method as paragraph AC recites, further comprising: determining audio characteristics for the plurality of sounds, the audio characteristics comprising one or more of a frequency, a volume, a pitch, a tone, or a duration; and causing a portion of the plurality of speakers to dynamically emit the plurality of sounds based at least in part on the audio characteristics, wherein at least two sounds of the plurality of sounds have different audio characteristics.

AE. The method as any of paragraphs AC-AD recite, further comprising: determining a timing for emitting the plurality of sounds; and causing at least a portion of the plurality of speakers to dynamically emit the plurality of sounds based at least in part on the timing, wherein at least two sounds of the plurality of sounds are emitted at different times.

AF. The method as paragraph AE recites, wherein causing the portion of the plurality of speakers to dynamically emit the plurality of sounds comprises causing, based at least in part on the different times, the portion of the plurality of speakers to emit the plurality of sounds in a sequence from a first side of the vehicle to a second side of the vehicle.

AG. The method as any of paragraphs AC-AF recite, further comprising: receiving, from a sensor on the vehicle, sensor data associated with an environment of the vehicle; determining, based at least in part on the sensor data, a velocity of the vehicle; determining that the velocity does not meet or exceed a threshold velocity; and causing the portion of the plurality of speakers to dynamically emit the plurality of sounds based at least in part on determining that the velocity does not meet or exceed the threshold velocity.

AH. The method as paragraph AG recites, further comprising causing the portion of the plurality of speakers to dynamically emit the plurality of sounds until the velocity is determined to meet or exceed the threshold velocity.

AI. The method as any of paragraphs AC-AH recite, further comprising causing the portion of the plurality of speakers to dynamically emit the plurality of sounds from right to left across the acoustic array, wherein a first speaker associated with a first channel of the plurality of channels emits a first sound at a first time and a second speaker associated with a second channel of the plurality of channels emits a second sound at a second time after the first time, and the first speaker is positioned to the right of the second speaker on the acoustic array.

AJ. One or more non-transitory computer-readable media storing instructions that, when executed by one or more processors, cause the one or more processors to perform acts comprising: determining a plurality of signals configured to cause a plurality of speakers associated with an acoustic array disposed on a vehicle to emit a plurality of sounds, wherein the plurality of speakers are associated with a plurality of channels; and causing, based at least in part on the plurality of signals, a portion of the plurality of speakers to emit the plurality of sounds, the plurality of sounds being spatialized across at least one surface of the vehicle such that, when perceived by a pedestrian proximate the vehicle, the pedestrian is capable of perceiving an extent of the vehicle, a location of the vehicle, or a velocity of the vehicle.

AK. The one or more non-transitory computer-readable media as paragraph AJ recites, wherein the plurality of signals comprise instructions to vary at least one of an audio characteristic, a timing, or a volume of individual sounds of the plurality of sounds.

AL. The one or more non-transitory computer-readable media as any of paragraphs AJ-AK recite, the acts further comprising: receiving, from a sensor on the vehicle, sensor data associated with an environment of the vehicle; determining, based at least in part on the sensor data, a velocity of the vehicle; determining that the velocity does not meet or exceed a threshold velocity; and causing the portion of the plurality of speakers to emit the plurality of sounds based at least in part on determining that the velocity does not meet or exceed the threshold velocity.

AM. The one or more non-transitory computer-readable media as any of paragraphs AJ-AL recite, the acts further comprising: determining, based at least in part on the sensor data, the location of the vehicle; and causing the portion of the plurality of speakers to emit the plurality of sounds based at least in part on the location.

AN. The one or more non-transitory computer-readable media as any of paragraphs AJ-AM recite, wherein plurality of sounds are emitted sequentially from a first speaker proximate a first side of the acoustic array to a last speaker at a second side of the acoustic array.

AO. While paragraphs A-E and U-AB are described above with respect to a system, it is understood in the context of this document that the content of paragraphs A-E and/or U-AB may also be implemented via a method, device, and/or computer storage media. While paragraphs N-T and AC-AI are described above with respect to a method, it is understood in the context of this document that the content of paragraphs N-T and/or AC-AI may also be implemented via a system, device, and/or computer storage media. While paragraphs F-M and AJ-AN are described above with respect to a non-transitory computer-readable medium, it is understood in the context of this document that the content of paragraphs F-M and/or AJ-AN may also be implemented via a method, device, and/or system.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
receiving sensor data from a sensor associated with a vehicle;
determining, based at least in part on the sensor data, a first location associated with an object and a second location associated with the vehicle;
determining, based at least in part on the first location and the second location, an instruction for emitting beams of acoustic energy via an acoustic array associated with the vehicle; and
causing the acoustic array to emit a first beam of acoustic energy in a first direction at a first time and a second beam of acoustic energy at a second time after the first time in a second direction that differs from the first direction by an offset based at least in part on a dimension of the object.

2. The system of claim 1, the operations further comprising determining the offset based at least in part on the dimension of the object and at least one of:
a position of the object;
an orientation of the object;
a distance between the object and the system;
an angle of the object relative to the system; or
a type of message to be communicated.

3. The system of claim 1, the operations further comprising:
determining that the first location of the object is within a threshold distance to the second location; and
determining the instruction based at least in part on determining that the first location is within the threshold distance to the second location.

4. The system of claim 1, the operations further comprising:
determining, based at least in part on the sensor data, a trajectory associated with the object; and
determining the instruction further based at least in part on the trajectory.

5. The system of claim 1, wherein the first beam and the second beam are emitted at a frequency to effectuate an oscillation from a first side of the object to a second side of the object.

6. The system claim 1, wherein the acoustic array comprises a plurality of speakers.

7. The system of claim 1, wherein the object is a pedestrian and the first beam and the second beam are output within a threshold amount of time associated with determining that the object is the pedestrian.

8. One or more non-transitory computer-readable media storing instructions that, when executed by one or more processors, cause the one or more processors to perform operations comprising:
receiving sensor data from a sensor associated with a vehicle;
determining, based at least in part on the sensor data, a first location associated with an object and a second location associated with the vehicle;
determining, based at least in part on the first location and the second location, an instruction for emitting beams of acoustic energy via an acoustic array associated with the vehicle; and
causing the acoustic array to emit a first beam of acoustic energy in a first direction at a first time and a second beam of acoustic energy at a second time after the first time in a second direction that differs from the first direction by an angular offset based at least in part on a pose of the object.

9. The one or more non-transitory computer-readable media of claim 8, the operations further comprising determining the angular offset based at least in part on the pose of the object and at least one of:
a distance between the object and the vehicle;
an angle of the object relative to the vehicle; or
a type of message to be communicated,
wherein the pose of the object comprises at least one of an extent, a position, or an orientation of the object.

10. The one or more non-transitory computer-readable media of claim 8, the operations further comprising:
determining that the first location is within a threshold distance to the second location; and
determining the instruction based at least in part on the first location being within the threshold distance to the second location.

11. The one or more non-transitory computer-readable media of claim 8, wherein the first time and the second time are associated with a period of time, the operations further comprising:
causing the acoustic array to emit a third beam at a third time and a fourth beam at a fourth time, wherein the third time and the fourth time are associated with the period of time.

12. The one or more non-transitory computer-readable media of claim 8, wherein the first beam and the second beam are emitted at a frequency to effectuate an oscillation from a first side of the object to a second side of the object.

13. The one or more non-transitory computer-readable media of claim 8, wherein the object is a pedestrian and the first beam and the second beam are output within a threshold amount of time based at least in part on determining that the object is the pedestrian.

14. A method comprising:
receiving sensor data from a sensor associated with a vehicle;
determining, based at least in part on the sensor data, a first location associated with an object and a second location associated with the vehicle;
determining, based at least in part on the first location and the second location, an instruction for emitting beams of acoustic energy via an acoustic array associated with the vehicle; and
causing the acoustic array to emit a first beam of acoustic energy in a first direction at a first time and a second beam of acoustic energy at a second time after the first time in a second direction that differs from the first direction by an offset based at least in part on a dimension of the object.

15. The method of claim 14, comprising determining the offset based at least in part on the dimension of the object and at least one of:
a position of the object;
an orientation of the object;
a distance between the object and the vehicle;
an angle of the object relative to the vehicle; or
a type of message to be communicated.

16. The method of claim 14, further comprising:
determining that the first location of the object is within a threshold distance to the second location; and determining the instruction based at least in part on determining that the first location is within the threshold distance to the second location.

17. The method of claim 14, further comprising:
varying an amplitude of at least one of the first beam or the second beam over time.

18. The method of claim 14, wherein the first beam and the second beam are emitted at a frequency to effectuate an oscillation from a first side of the object to a second side of the object.

19. The method of claim 14, wherein the acoustic array comprises a plurality of speakers.

20. The method of claim 14, wherein the object is a pedestrian and the first beam and the second beam are output within a threshold amount of time associated with determining that the object is the pedestrian.

\* \* \* \* \*